(12) United States Patent
Tatai et al.

(10) Patent No.: US 9,117,101 B2
(45) Date of Patent: Aug. 25, 2015

(54) MEDIUM PROCESSING APPARATUS AND CONTROL METHOD FOR MEDIUM PROCESSING APPARATUS

(75) Inventors: Toshio Tatai, Nagano (JP); Keiji Ohta, Nagano (JP); Naohito Nakayama, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/235,987

(22) PCT Filed: May 21, 2012

(86) PCT No.: PCT/JP2012/062907
§ 371 (c)(1),
(2), (4) Date: Jan. 29, 2014

(87) PCT Pub. No.: WO2013/018419
PCT Pub. Date: Feb. 7, 2013

(65) Prior Publication Data
US 2014/0191032 A1    Jul. 10, 2014

(30) Foreign Application Priority Data

Jul. 29, 2011  (JP) .................. 2011-166992
Jul. 29, 2011  (JP) .................. 2011-166993

(51) Int. Cl.
*G06K 7/00* (2006.01)
*G07B 1/00* (2006.01)
(Continued)

(52) U.S. Cl.
CPC .............. *G06K 7/0004* (2013.01); *G06K 7/082* (2013.01); *G06K 13/067* (2013.01); *G06K 13/073* (2013.01); *G07B 1/00* (2013.01); *G07B 11/03* (2013.01)

(58) Field of Classification Search
CPC ........... G06K 7/00; G06K 7/08; G06K 7/082; G06K 7/0004; G06K 13/073; G06K 13/067
USPC .................... 235/440, 375, 439, 435, 446
See application file for complete search history.

(56) References Cited

U.S. PATENT DOCUMENTS 4,544,574 A * 10/1985 Itami et al. .................. 427/549
7,456,593 B1 * 11/2008 Floresta et al. ............... 318/135
(Continued)

FOREIGN PATENT DOCUMENTS

| JP | 61-153789 A | 7/1986 |
| JP | 3-144880 A | 6/1991 |

(Continued)

OTHER PUBLICATIONS

International Search Report for International Application No. PCT/JP2012/062907, mailed Jun. 19, 2012, with English translation.

*Primary Examiner* — Edwyn Labaze
(74) *Attorney, Agent, or Firm* — Cantor Colburn LLP

(57) ABSTRACT

A processing device for a medium may include magnetic heads which face a medium transport channel from a lower side, magnetic heads which face the medium transport channel from an upper side, pad rollers which are disposed so as to face each of the magnetic heads, a movement mechanism for evacuating pad rollers from the medium transport channel, and a movement mechanism for evacuating pad rollers from the medium transport channel. In the transport direction for the recording medium, the magnetic head and the magnetic head are offset from each other, and the distance between the magnetic head and the magnetic head in the direction is shorter than the length of the range for recording of magnetic data recorded upon a magnetic stripe of the recording medium.

13 Claims, 10 Drawing Sheets

(51) Int. Cl.
  *G06K 13/067*   (2006.01)
  *G06K 13/073*   (2006.01)
  *G06K 7/08*     (2006.01)
  *G07B 11/03*    (2006.01)

(56) References Cited

U.S. PATENT DOCUMENTS

2003/0052167 A1* 3/2003 Hilton et al. ............... 235/449
2007/0262771 A1* 11/2007 Van Drent et al. ........... 324/212
2008/0128489 A1* 6/2008 Beskitt et al. ............... 235/379

FOREIGN PATENT DOCUMENTS

| | | |
|---|---|---|
| JP | 7-73347 A | 3/1995 |
| JP | 7-26909 A | 5/1995 |
| JP | 2000-3412 A | 1/2000 |
| JP | 2000-182092 A | 6/2000 |
| JP | 2001-325623 A | 11/2001 |
| JP | 2004-243733 A | 9/2004 |
| JP | 2005-7807 A | 1/2005 |
| JP | 2006-286108 A | 10/2006 |
| JP | 2009-151575 A | 7/2009 |
| JP | 2010-202326 A | 9/2010 |

* cited by examiner

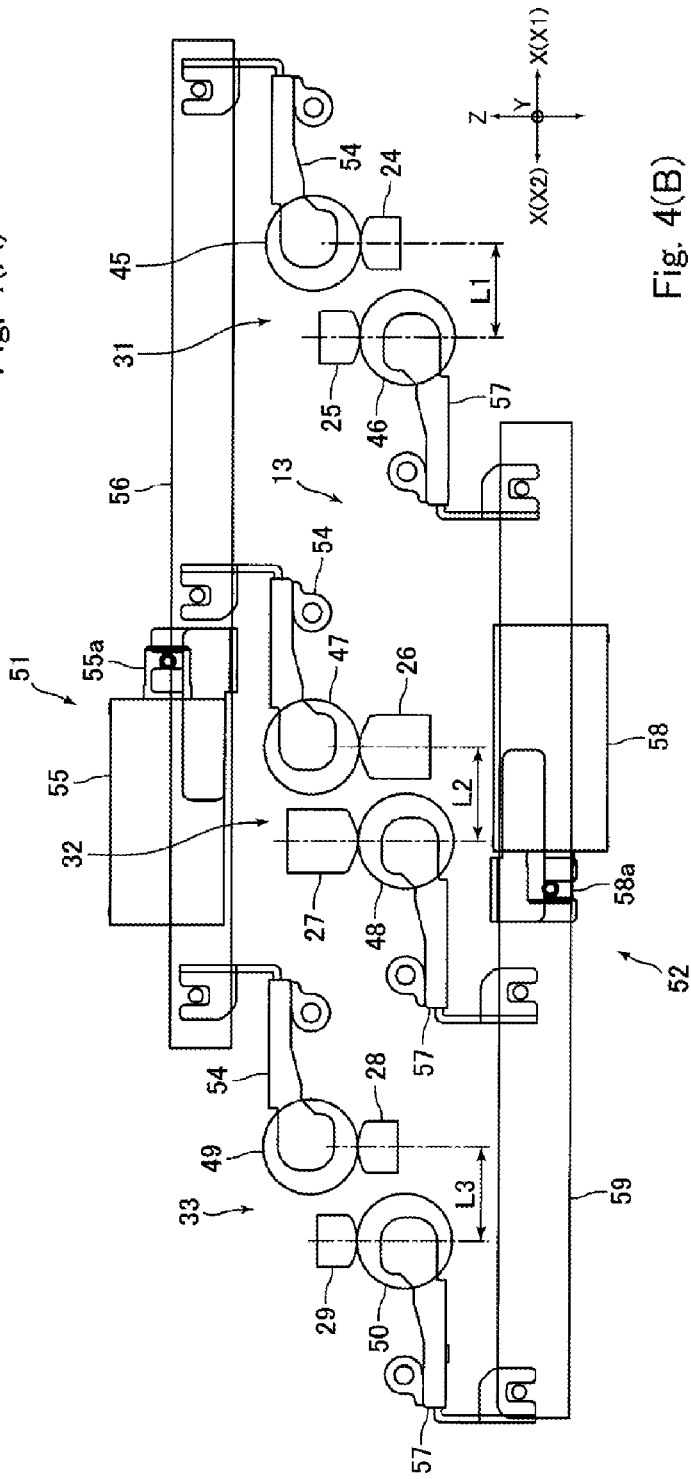
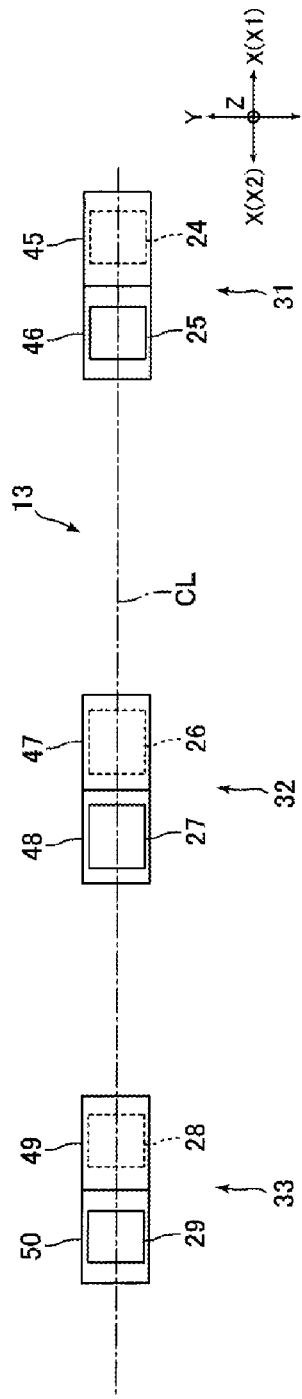

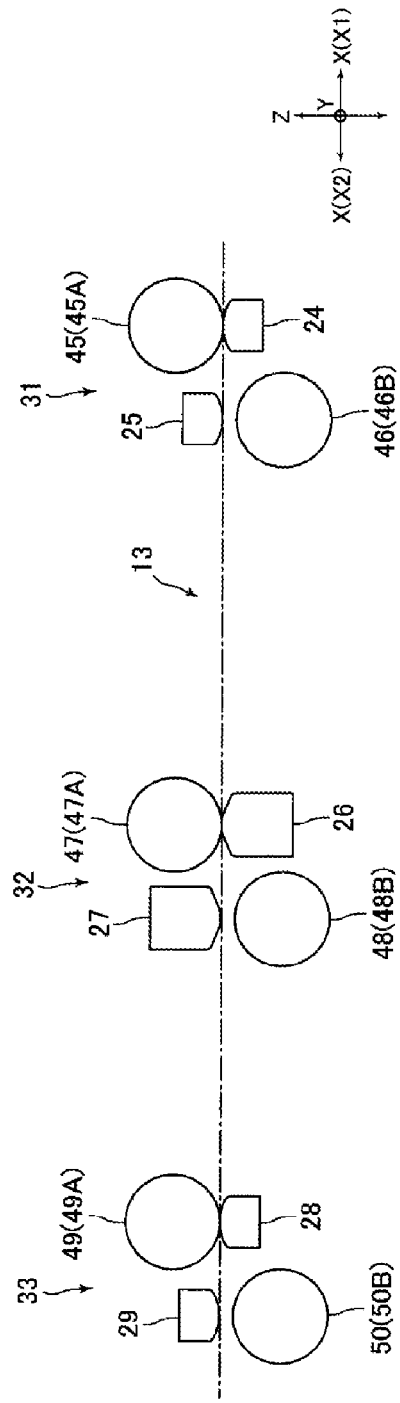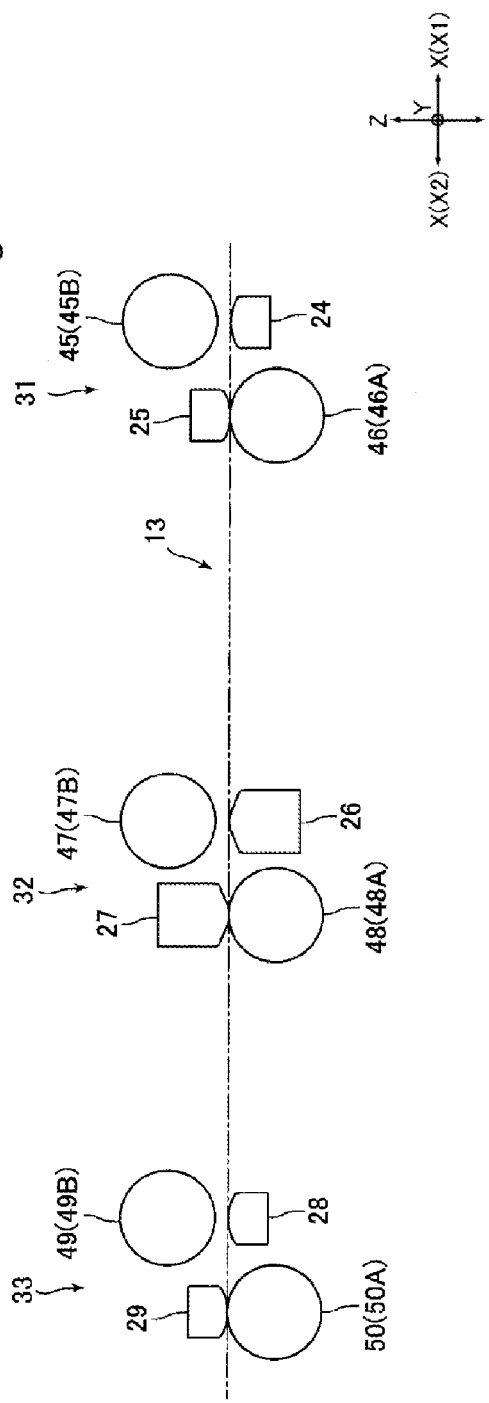

Fig. 6
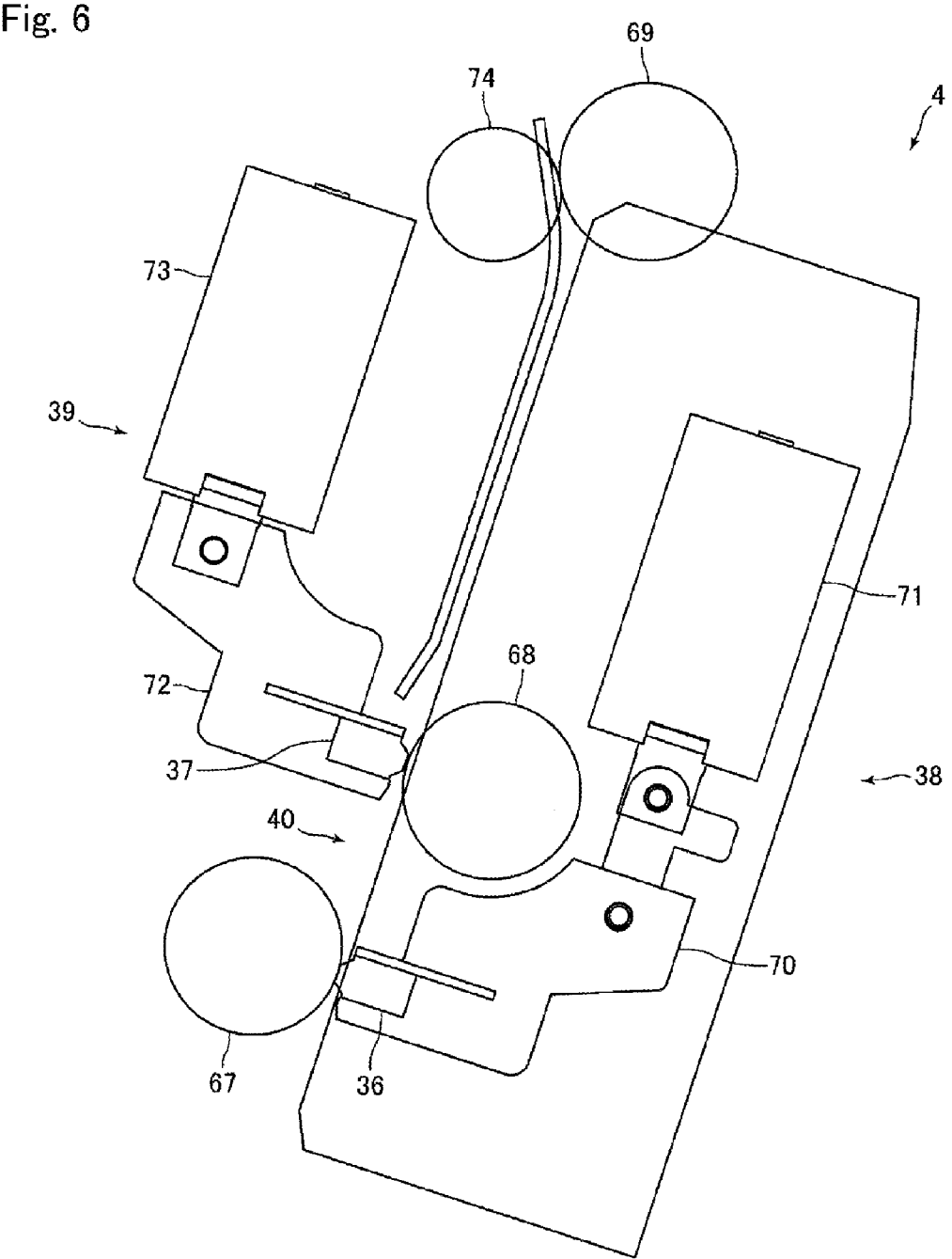
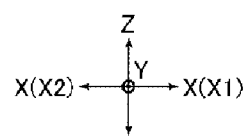

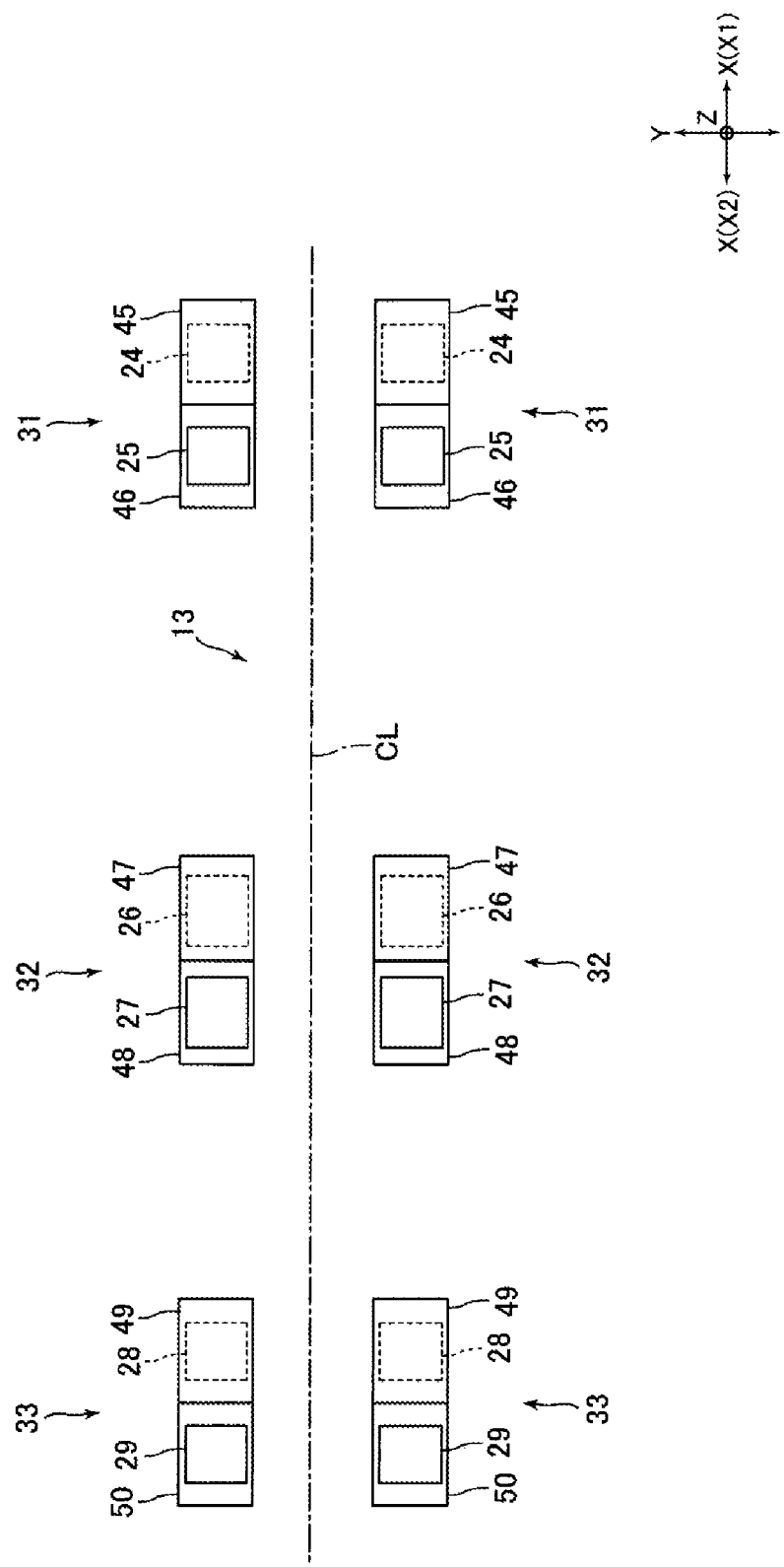

MEDIUM PROCESSING APPARATUS AND CONTROL METHOD FOR MEDIUM PROCESSING APPARATUS

CROSS REFERENCE TO RELATED APPLICATIONS

This is the U.S. national stage of International Application No. PCT/JP2012/062907, filed on May 21, 2012. Priority under 35 U.S.C. §119(a) and 35 U.S.C. §365(b) is claimed from Japanese Application No. 2011-166992, filed Jul. 29, 2011 and Japanese Application No. 2011-166993, filed Jul. 29, 2011, the disclosures of which are also incorporated herein by reference.

FIELD OF THE INVENTION

At least an embodiment of the present invention relates to a medium processing apparatus which performs reading of magnetic data recorded on a card-shaped recording medium having a magnetic stripe and writing of magnetic data on the recording medium.

BACKGROUND

Conventionally, as an automatic ticket gate machine installed at a ticket gate of a station, an automatic ticket gate machine has been known which includes a bypass conveying passage and a reversing mechanism for reversing the front and back of a railway ticket which is inserted into an input port. (See, for example, Patent Literature 1). The automatic ticket gate machine described in Patent Literature 1 judges the front face and the back face of a railway ticket which is taken into through an input port. When the railway ticket is taken into the inside in a state that its front face faces upward, predetermined processing such as reading or writing of magnetic data is performed on the railway ticket as it is and, when the railway ticket is taken into in a state that its back face faces upward, the railway ticket is conveyed to the bypass conveying passage to reverse the state of the front face and the back face by the reversing mechanism and then, the railway ticket is returned to a normal conveying passage again and a predetermined processing is performed on the railway ticket.

In the automatic ticket gate machine described in Patent Literature 1, in a case that a railway ticket is taken into the inside in a state that its back face faces upward, the predetermined processing is performed after the state of the front face and the back face of the railway ticket is reversed and thus processing of the railway ticket in this case requires much time.

Therefore, conventionally, a magnetic recording medium reading/writing apparatus has been proposed which is capable of performing predetermined processing on a recording medium at a high speed regardless of a taking posture of a recording medium such as a railway ticket (see, for example, Patent Literature 2). A magnetic stripe of a recording medium which is used in the magnetic recording medium reading/writing apparatus described in Patent Literature 2 is displaced from the center of a recording medium in a widthwise direction of the recording medium which is perpendicular to a conveyance direction of the recording medium. Therefore, the magnetic recording medium reading/writing apparatus includes a first reading/writing unit which performs reading and writing of magnetic data when a recording medium is taken into the apparatus from one end side of the recording medium in a state that the front face of the recording medium faces upward, a second reading/writing unit which performs reading and writing of magnetic data when a recording medium is taken into the apparatus from the other end side of the recording medium in a state that the front face of the recording medium faces downward, a third reading/writing unit which performs reading and writing of magnetic data when a recording medium is taken into the apparatus from the other end side of the recording medium in a state that the front face of the recording medium faces upward, and a fourth reading/writing unit which performs reading and writing of magnetic data when a recording medium is taken into the apparatus from the one end side of the recording medium in a state that the front face of the recording medium faces downward.

In the magnetic recording medium reading/writing apparatus described in Patent Literature 2, the first through the fourth reading/writing units are disposed in order and in line along the conveying passage for a recording medium. Further, the magnetic head structuring the first reading/writing unit and the magnetic head structuring the third reading/writing unit are disposed so as to face the conveying passage from a lower side, and the magnetic head structuring the second reading/writing unit and the magnetic head structuring the fourth reading/writing unit are disposed so as to face the conveying passage from an upper side. Further, the magnetic head structuring the first reading/writing unit and the magnetic head structuring the second reading/writing unit are disposed at a position displaced to one side with respect to the center of the conveying passage in a widthwise direction of a recording medium, and the magnetic head structuring the third reading/writing unit and the magnetic head structuring the fourth reading/writing unit are disposed at a position displaced to the other side with respect to the center of the conveying passage in the widthwise direction of the recording medium. Further, a pad roller which is urged toward the magnetic head is oppositely disposed to each of the magnetic heads.

In the magnetic recording medium reading/writing apparatus described in Patent Literature 2, even when a recording medium is taken into the inside in any posture, predetermined processing can be performed without reversing the recording medium and thus the recording medium can be performed with predetermined processing at a high speed.

Another present invention relates to a medium processing apparatus provided with a reading function of magnetic data recorded on a card-shaped recording medium and a printing function on a recording medium, and relates to a control method for the medium processing apparatus.

The word "printing" in the present specification includes printing a figure, a sign and a pattern written on a recording medium in addition to printing characters written on a recording medium. Further, the word "print a character" in the present specification includes printing of a figure, a sign or a pattern on a recording medium in addition to printing of a character on a recording medium.

Conventionally, as an automatic ticket gate machine installed at a ticket gate of a station, an automatic ticket gate machine has been known which includes a magnetic processing part, which performs reading of magnetic data of a railway ticket and writing of magnetic data on a railway ticket put into from an input port, and a printing part for printing characters on a railway ticket. (See, for example, Patent Literature 3). In the automatic ticket gate machine described in Patent Literature 1, the printing part includes two thermal heads, i.e., a thermal head which is structured to contact with one face of a railway ticket and print characters by a thermal method, and a thermal head which is structured to contact with the other face of a railway ticket and print characters by a thermal method.

Patent Literature

[PTL 1] Japanese Patent Laid-Open No. 2001-325623
[PTL 2] Japanese Patent Laid-Open No. 2006-286108
[PTL 3] Japanese Patent Laid-Open No. 2005-7807

As described above, in the magnetic recording medium reading/writing apparatus described in Patent Literature 2, a recording medium can be processed at a high speed. However, in the magnetic recording medium reading/writing apparatus, the first through the fourth reading/writing units are disposed in order and in line along the conveying passage for a recording medium and thus the size of the apparatus is increased in the conveyance direction of a recording medium.

SUMMARY

In view of the problem described above, at least an embodiment of the present invention provides a medium processing apparatus which is capable of processing a recording medium at a high speed and reducing its size in a conveyance direction of a recording medium.

Further, generally, in an automatic ticket gate machine, a railway ticket is taken into the automatic ticket gate machine in various postures. In other words, a railway ticket is sometimes taken into the automatic ticket gate machine from one end side of the railway ticket in a state that a front face of the railway ticket faces upward and, alternatively, a railway ticket is sometimes taken into the automatic ticket gate machine from the other end side of a railway ticket in a state that a front face of the railway ticket faces upward. Further, a railway ticket is sometimes taken into the automatic ticket gate machine from one end side of the railway ticket in a state that a back face of the railway ticket faces upward and, alternatively, a railway ticket is sometimes taken into the automatic ticket gate machine from the other end side of a railway ticket in a state that a back face of the railway ticket faces upward. On the other hand, even when a railway ticket is taken into the automatic ticket gate machine in various postures as described above, the automatic ticket gate machine is required to perform appropriate printing of characters at a predetermined position of the railway ticket.

In view of the problem described above, at least an embodiment of the present invention provides a medium processing apparatus which is capable of performing appropriate printing at a predetermined position of a recording medium even when the recording medium is taken into the medium processing apparatus in various postures. Further, at least an embodiment of the present invention provides a control method for a medium processing apparatus which is capable of performing appropriate printing at a predetermined position of a recording medium even when the recording medium is taken into the medium processing apparatus in various postures.

In order to attain the above, At least an embodiment of the present invention provides a medium processing apparatus including a medium conveying passage along which a card-shaped recording medium having a magnetic stripe is conveyed, a magnetic head part having a first magnetic head which faces the medium conveying passage from one side in a thickness direction of the recording medium passing through the medium conveying passage, a second magnetic head which faces the medium conveying passage from the other side in the thickness direction of the recording medium, a first pad roller which is oppositely disposed to the first magnetic head and is urged toward the first magnetic head, and a second pad roller which is oppositely disposed to the second magnetic head and is urged toward the second magnetic head, a first moving mechanism which moves the first magnetic head and/or the first pad roller between a first contact position where the first magnetic head and the first pad roller are capable of contacting with the recording medium and a first retreated position where the first magnetic head and/or the first pad roller are retreated in a direction separated from the medium conveying passage, and a second moving mechanism which moves the second magnetic head and/or the second pad roller between a second contact position where the second magnetic head and the second pad roller are capable of contacting with the recording medium and a second retreated position where the second magnetic head and/or the second pad roller are retreated in a direction separated from the medium conveying passage. The first magnetic head and the second magnetic head are displaced from each other in the magnetic head part in a conveyance direction of the recording medium, and a distance between the first magnetic head and the second magnetic head in the conveyance direction of the recording medium is shorter than a length of a recorded range of magnetic data recorded in the magnetic stripe.

The medium processing apparatus in accordance with At least an embodiment of the present invention includes a first magnetic head which faces the medium conveying passage from one side in a thickness direction of the recording medium and a second magnetic head which faces the medium conveying passage from the other side in the thickness direction of the recording medium. Therefore, for example, even when a recording medium is taken into the medium processing apparatus in a state that its front face faces upward or, even when the recording medium is taken into the medium processing apparatus in a state that its back face faces upward, predetermined processing can be performed on the recording medium by the first magnetic head or the second magnetic head without reversing the recording medium in the inside of the medium processing apparatus. Accordingly, in At least an embodiment of the present invention, processing of a recording medium can be performed at a high speed.

Further, in the medium processing apparatus in accordance with At least an embodiment of the present invention, a distance between the first magnetic head and the second magnetic head in the conveyance direction of the recording medium is shorter than a length of a recorded range of magnetic data recorded in the magnetic stripe. Therefore, even when the first magnetic head and the second magnetic head are displaced from each other in the conveyance direction of the recording medium, the distance between the first magnetic head and the second magnetic head in the conveyance direction of the recording medium can be shortened and, as a result, the size of the apparatus can be reduced in the conveyance direction of the recording medium.

On the other hand, in At least an embodiment of the present invention, the distance between the first magnetic head and the second magnetic head in the conveyance direction of the recording medium is shorter than the length of the recorded range of magnetic data which are recorded in the magnetic stripe. Therefore, for example, in a case that the first magnetic head is disposed on an upstream side and the second magnetic head is disposed on a downstream side in the conveyance direction of the recording medium, when the recording medium is entered between the second magnetic head and the second pad roller at the time of performing reading or writing of magnetic data by the first magnetic head, the speed of the conveyed recording medium may be varied to deteriorate the jitter. Further, when the recording medium comes out from between the first magnetic head and the first pad roller at the time of performing reading or writing of magnetic data by the second magnetic head, the speed of the conveyed recording medium may be varied to deteriorate the jitter.

The medium processing apparatus in At least an embodiment of the present invention includes a first moving mechanism which moves the first magnetic head and/or the first pad roller between a first contact position where the first magnetic head and the first pad roller are capable of contacting with the recording medium and a first retreated position where the first magnetic head and/or the first pad roller are retreated in a direction separated from the medium conveying passage, and a second moving mechanism which moves the second magnetic head and/or the second pad roller between a second contact position where the second magnetic head and the second pad roller are capable of contacting with the recording medium and a second retreated position where the second magnetic head and/or the second pad roller are retreated in a direction separated from the medium conveying passage. Therefore, when reading or writing of magnetic data is performed by the first magnetic head, the second magnetic head and/or the second pad roller can be retreated from the medium conveying passage by the second moving mechanism and, when reading or writing of magnetic data is performed by the second magnetic head, the first magnetic head and/or the first pad roller can be retreated from the medium conveying passage by the first moving mechanism. As a result, according to At least an embodiment of the present invention, even when the distance between the first magnetic head and the second magnetic head in the conveyance direction of the recording medium is short, variation of the conveyance speed of the recording medium at the time of performing reading or writing of magnetic data by the first magnetic head or the second magnetic head can be suppressed and deterioration of the jitter can be suppressed.

In At least an embodiment of the present invention, the medium processing apparatus includes, for example, a detection mechanism which is disposed on an upstream side in the conveyance direction of the recording medium with respect to the magnetic head part and is structured to detect whether the recording medium is inserted into the medium processing apparatus in a state that one face of the recording medium faces on a first magnetic head side or the other face of the recording medium faces on the first magnetic head side, and the first moving mechanism and the second moving mechanism are controlled on the basis of a detection result by the detection mechanism. In this case, for example, even when a recording medium is taken into the medium processing apparatus in a state that its front face faces upward or, even when the recording medium is taken into the medium processing apparatus in a state that its back face faces upward, the first moving mechanism or the second moving mechanism can be operated at a short time on the basis of a detection result of the detection mechanism.

In At least an embodiment of the present invention, the magnetic stripe is, for example, formed over the entire face of one face of the recording medium. In this case, it is sufficient that the magnetic head part is disposed so that the centers of the first and the second magnetic heads are coincided with the center of the medium conveying passage in a widthwise direction of the recording medium perpendicular to a thickness direction of the recording medium and the conveyance direction of the recording medium. In other words, in this case, two magnetic head parts are not required to dispose so as to interpose the center of the medium conveying passage. Therefore, the structure of the medium processing apparatus can be simplified.

In At least an embodiment of the present invention, it is preferable that the first magnetic head is disposed so as to face the medium conveying passage from a lower side, the second magnetic head is disposed so as to face the medium conveying passage from an upper side and, in a standby state before the recording medium is inserted, the first magnetic head and/or the first pad roller are disposed at the first contact position, and the second magnetic head and/or the second pad roller are disposed at the second retreated position. In a recording medium such as a railway ticket, a magnetic stripe is commonly formed on its back face. Further, a user who uses a recording medium such as a railway ticket commonly inserts the recording medium into the medium processing apparatus in a state that its front face faces upward with a high degree of probability. Therefore, according to this structure, even when the first moving mechanism and the second moving mechanism are not operated, processing for the recording medium can be performed with a high degree of probability. Accordingly, the number of times of operations of the first moving mechanism and the second moving mechanism can be reduced and, as a result, wear and the like of components structuring the first moving mechanism and the second moving mechanism can be restrained.

Further, in this case, it is preferable that the second magnetic head is disposed on a downstream side in the conveyance direction of the recording medium with respect to the first magnetic head. According to this structure, when the second magnetic head and/or the second pad roller are moved to the second contact position before one end part of the recording medium reaches the second magnetic head, magnetic data can be read or written by the second magnetic head and, in addition, when the first magnetic head and/or the first pad roller are moved to the first retreated position before the other end part of the recording medium comes out from between the first magnetic head and the first pad roller, deterioration of the jitter can be suppressed. In other words, according to this structure, even when moving times of the first magnetic head and/or the first pad roller by the first moving mechanism and moving times of the second magnetic head and/or the second pad roller by the second moving mechanism are long (in other words, even when an operating speed of the first moving mechanism and an operating speed of the second moving mechanism are slow), reading or writing of magnetic data by the second magnetic head can be performed and deterioration of the jitter can be suppressed. Therefore, structures of the first moving mechanism and the second moving mechanism can be simplified.

In At least an embodiment of the present invention, the detection mechanism is, for example, a pre-head which detects the magnetic stripe. In this case, for example, the pre-head is disposed so as to face the medium conveying passage from either of one side or the other side in a thickness direction of the recording medium.

In At least an embodiment of the present invention, it is preferable that the medium processing apparatus includes the magnetic head part having a first magnetic head part in which the first magnetic head and the second magnetic head are a reading head for reading magnetic data recorded in the magnetic stripe, and a second magnetic head part in which the first magnetic head and the second magnetic head are a writing head for writing magnetic data in the magnetic stripe, and that the second magnetic head part is disposed on a downstream side in the conveyance direction of the recording medium with respect to the first magnetic head part, and the pre-head reads magnetic data recorded in the magnetic stripe. According to this structure, a time period after magnetic data recorded in the magnetic stripe are read and before magnetic data are written to the magnetic stripe can be lengthened. Therefore, for example, in a case that magnetic data to be written in a recording medium by the second magnetic head part are created on the basis of a reading result of magnetic data recorded in the magnetic stripe of the recording medium, a creating time of magnetic data to be written can be secured. As a result, even when a conveyance speed of the recording medium is fast, magnetic data can be appropriately written in the recording medium by the second magnetic head part.

In At least an embodiment of the present invention, it is preferable that the medium processing apparatus includes a plurality of magnetic head parts, and the first moving mechanism moves the first magnetic heads and/or the first pad rollers of the plurality of the magnetic head parts together, and the second moving mechanism moves the second magnetic heads and/or the second pad rollers of the plurality of the magnetic head parts together. According to this structure, in comparison with a case that the first moving mechanism and the second moving mechanism individually move a plurality of the first and the second magnetic heads and a plurality of the first and the second pad rollers, the structures of the first moving mechanism and the second moving mechanism can be simplified.

Next, in order to attain the above, At least an embodiment of the present invention provides a medium processing apparatus and a control method for a medium processing apparatus as described below.

In order to attain the above, At least an embodiment of the present invention provides a medium processing apparatus including a medium conveying passage along which a card-shaped recording medium having a magnetic stripe is conveyed, a first magnetic head which faces the medium conveying passage from one side in a thickness direction of the recording medium passing through the medium conveying passage, a second magnetic head which faces the medium conveying passage from the other side in the thickness direction of the recording medium, a detection mechanism which is disposed on an upstream side in the conveyance direction of the recording medium with respect to the first magnetic head and the second magnetic head and is structured to detect whether the recording medium is inserted into the medium processing apparatus in a state that one face of the recording medium faces on a first magnetic head side or the other face of the recording medium faces on the first magnetic head side, a first thermal head which faces the medium conveying passage from one side in the thickness direction of the recording medium, a second thermal head which faces the medium conveying passage from the other side in the thickness direction of the recording medium, a first moving mechanism which moves the first thermal head between a first contact position where the first thermal head is capable of contacting with the recording medium and a first retreated position where the first thermal head is retreated in a direction separated from the medium conveying passage, a second moving mechanism which moves the second thermal head between a second contact position where the second thermal head is capable of contacting with the recording medium and a second retreated position where the second thermal head is retreated in a direction separated from the medium conveying passage, and a control section for controlling the first thermal head, the second thermal head, the first moving mechanism and the second moving mechanism. The control section operates the first moving mechanism or the second moving mechanism based on a detection result by the detection mechanism to arrange the first thermal head to the first contact position or to arrange the second thermal head to the second contact position, and the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium.

In the medium processing apparatus in accordance with At least an embodiment of the present invention, the control section controls so that the first thermal head is arranged to the first contact position or the second thermal head is arranged to the second contact position on the basis of a detection result by the detection mechanism which detects whether a recording medium is inserted into the medium conveying passage in a state that one face of the recording medium faces on the first magnetic head side or the other face of the recording medium faces on the first magnetic head side. Further, according to At least an embodiment of the present invention, the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium.

Therefore, according to At least an embodiment of the present invention, for example, even when a recording medium is taken into the medium processing apparatus in either state that the front face of the recording medium faces upward or its back face faces upward and, even when the recording medium is taken into the medium processing apparatus from either side of one end side or the other end side of the recording medium, appropriate printing can be performed at a predetermined position of the recording medium. In other words, according to At least an embodiment of the present invention, even when a recording medium is taken into the medium processing apparatus in various postures, appropriate printing can be performed at a predetermined position of the recording medium.

In At least an embodiment of the present invention, the detection mechanism is, for example, a pre-head which detects the magnetic stripe.

Further, in order to attain the above, At least an embodiment of the present invention provides a medium processing apparatus including a medium conveying passage along which a card-shaped recording medium having a magnetic stripe is conveyed, a first magnetic head which faces the medium conveying passage from one side in a thickness direction of the recording medium passing through the medium conveying passage, a second magnetic head which faces the medium conveying passage from the other side in the thickness direction of the recording medium, a first thermal head which faces the medium conveying passage from one side in the thickness direction of the recording medium, a second thermal head which faces the medium conveying passage from the other side in the thickness direction of the recording medium, a first moving mechanism which moves the first thermal head between a first contact position where the first thermal head is capable of contacting with the recording medium and a first retreated position where the first thermal head is retreated in a direction separated from the medium conveying passage, a second moving mechanism which moves the second thermal head between a second contact position where the second thermal head is capable of contacting with the recording medium and a second retreated position where the second thermal head is retreated in a direction separated from the medium conveying passage, and a control section for controlling the first thermal head, the second thermal head, the first moving mechanism and the second moving mechanism. The control section determines whether the first magnetic head has read magnetic data or the second magnetic head has read magnetic data and, based on the determined result, the control section operates the first moving mechanism or the second moving mechanism to arrange the first thermal head to the first contact position or to arrange the second thermal head to the second contact position, and the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium.

In the medium processing apparatus in accordance with At least an embodiment of the present invention, the control section determines whether the first magnetic head has read magnetic data or the second magnetic head has read magnetic data and, based on the determined result, the control section operates the first moving mechanism or the second moving mechanism to arrange the first thermal head to the first contact position or to arrange the second thermal head to the second contact position. Further, in At least an embodiment of the present invention, the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium. Therefore, according to At least an embodiment of the present invention, even when a recording medium is taken into the medium processing apparatus in various postures, appropriate printing can be performed at a predetermined position of the recording medium.

Further, in order to attain the above, At least an embodiment of the present invention provides a control method for a medium processing apparatus having a medium conveying passage along which a card-shaped recording medium having a magnetic stripe is conveyed, a first magnetic head which faces the medium conveying passage from one side in a thickness direction of the recording medium passing through the medium conveying passage, a second magnetic head which faces the medium conveying passage from the other side in the thickness direction of the recording medium, a first thermal head which is disposed so as to face the medium conveying passage from one side in the thickness direction of the recording medium and is movable between a first contact position where the first thermal head is capable of contacting with the recording medium and a first retreated position where the first thermal head is retreated in a direction separated from the medium conveying passage, and a second thermal head which is disposed so as to face the medium conveying passage from the other side in the thickness direction of the recording medium and is movable between a second contact position where the second thermal head is capable of contacting with the recording medium and a second retreated position where the second thermal head is retreated in a direction separated from the medium conveying passage. The control method includes a first taking-in direction determining step which determines whether the recording medium has been inserted into the medium processing apparatus in a state that one face of the recording medium faces on a first magnetic head side or the other face of the recording medium faces on the first magnetic head side, a second taking-in direction determining step which determines whether the recording medium has been taken into the medium conveying passage from one end side of the recording medium or from the other end side based on a reading result of magnetic data by the first magnetic head or the second magnetic head, a thermal head moving step in which the first thermal head is moved to the first contact position or the second thermal head is moved to the second contact position based on the determined result in the first taking-in direction determining step, and a printing step in which, based on the determined result in the second taking-in direction determining step, printing is performed on the recording medium by the first thermal head or the second thermal head which is moved in the thermal head moving step while performing temperature control of the first thermal head or the second thermal head and performing conveyance control of the recording medium.

In the control method for a medium processing apparatus in accordance with At least an embodiment of the present invention, in the first taking-in direction determining step, it is determined whether a recording medium has been inserted into the medium conveying passage in a state that one face of the recording medium faces on the first magnetic head side or the other face of the recording medium faces on the first magnetic head side and, in the second taking-in direction determining step, it is determined whether the recording medium has been taken into the medium conveying passage from one end side of the recording medium or from the other end side based on a reading result of magnetic data by the first magnetic head or the second magnetic head. Further, according to At least an embodiment of the present invention, in the thermal head moving step, the first thermal head is moved to the first contact position or the second thermal head is moved to the second contact position on the basis of the detected result in the first taking-in direction determining step and, in the printing step, based on the determined result in the second taking-in direction determining step, printing is performed on the recording medium by the first thermal head or the second thermal head which is moved in the thermal head moving step while performing temperature control of the first thermal head or the second thermal head and performing conveyance control of the recording medium. Therefore, according to At least an embodiment of the present invention, even when a recording medium is taken into the medium processing apparatus in various postures, appropriate printing can be performed at a predetermined position of the recording medium.

As described above, according to the medium processing apparatus in accordance with At least an embodiment of the present invention, processing for a recording medium can be performed at a high speed and the size of the apparatus can be reduced in the conveyance direction of the recording medium.

Further, according to the medium processing apparatus and the control method for the medium processing apparatus in accordance with At least an embodiment of the present invention, even when a recording medium is taken into the medium processing apparatus in various postures, appropriate printing can be performed at a predetermined position of the recording medium.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is a side view for explaining a schematic structure of a medium processing apparatus in accordance with an embodiment of the present invention.

[FIG. 2]

FIG. 2(A) is a view showing a front face of a recording medium and FIG. 2(B) is a view showing a back face of the recording medium.

FIG. 3 is a block diagram showing a control section and structures relating to the control section of the medium processing apparatus in FIG. 1.

[FIG. 4]

FIG. 4(A) is a side view showing magnetic head parts, a first pad roller moving mechanism and a second pad roller moving mechanism shown in FIG. 1, and FIG. 4(B) is a plan view showing magnetic head parts in FIG. 1.

[FIG. 5]

FIGS. 5(A) and 5(B) are views for explaining an operation of magnetic head parts shown in FIG. 1.

[FIG. 6]

FIG. 6 is a side view showing a structure of a principal part of a print processing part shown in FIG. 1.

[FIG. 7]

FIG. 8 is a flow chart for explaining a schematic operation of the medium processing apparatus in FIG. 1.

[FIG. 9]

[FIG. 10]

FIG. 10 is a plan view showing magnetic head parts in accordance with another embodiment of the present invention.

DESCRIPTION OF EMBODIMENTS

An embodiment of the present invention will be described below with reference to the accompanying drawings.
(Schematic Structure of Medium Processing Apparatus)

Figure 1:
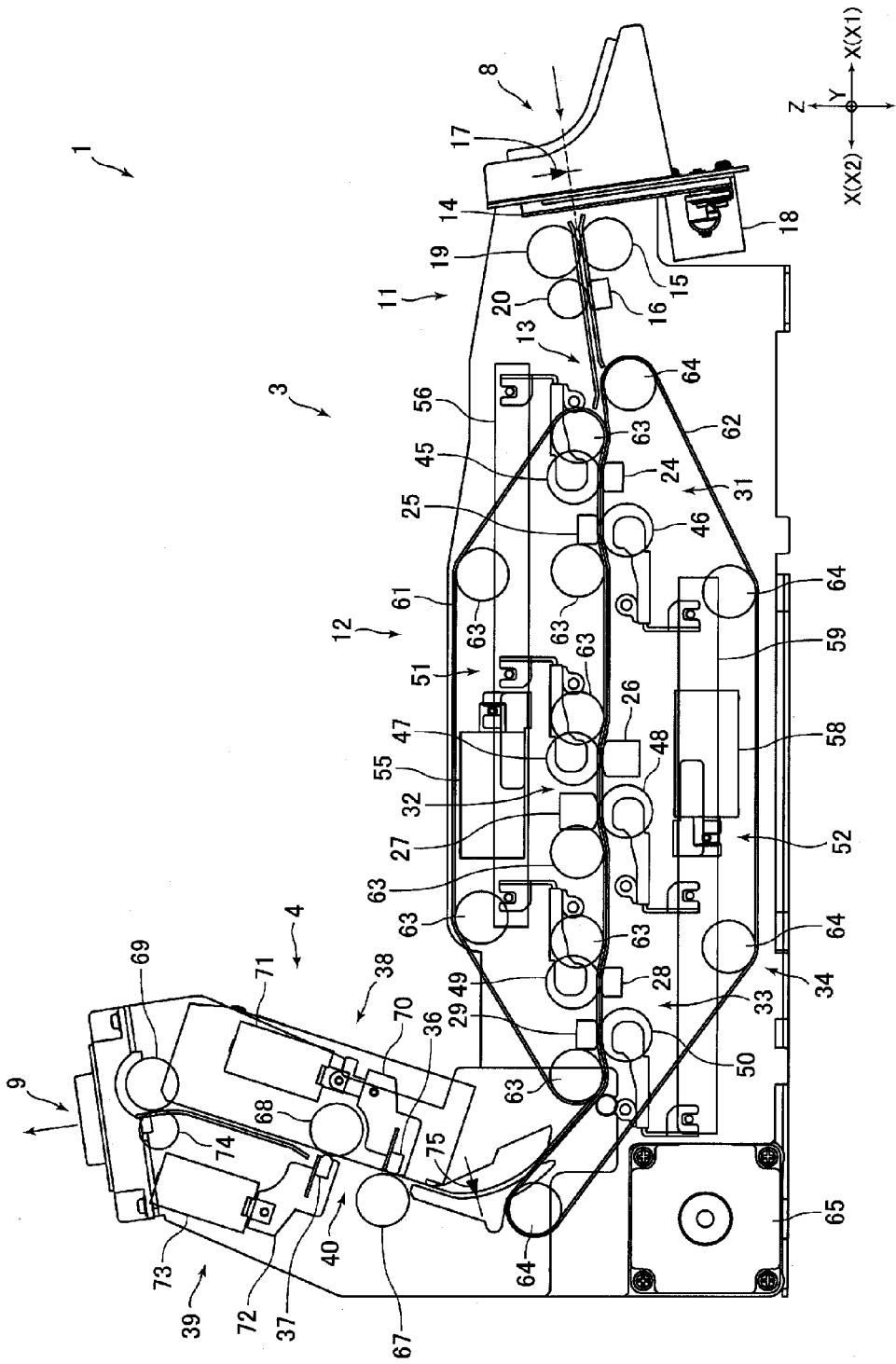
[FIG. 1]
Figure 2A:
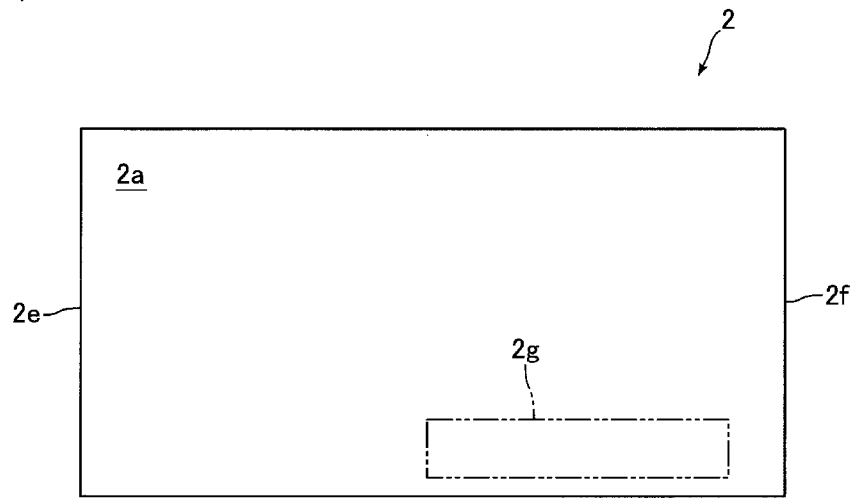
FIGS. 2(A) and 2(B) are views showing a recording medium which is used in the medium processing apparatus in FIG. 1.
Figure 2B:
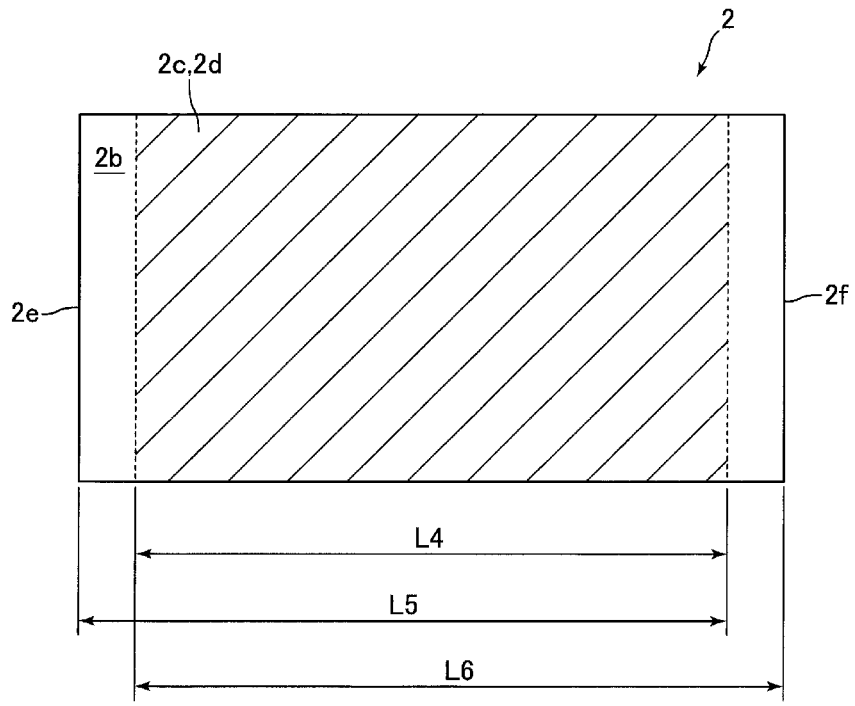
Figure 3:
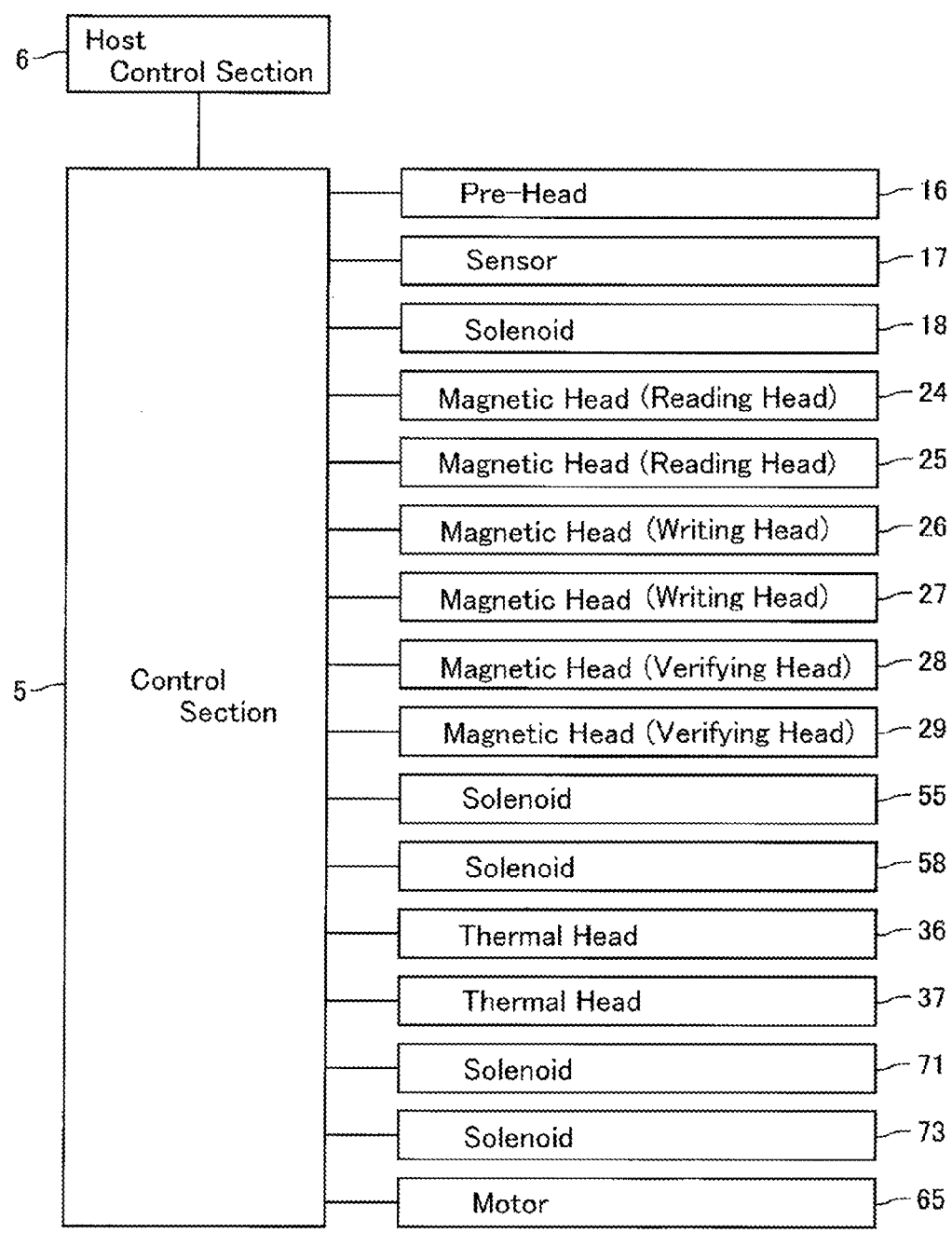
[FIG. 3]

FIG. 1 is a side view for explaining a schematic structure of a medium processing apparatus 1 in accordance with an embodiment of the present invention. FIGS. 2(A) and 2(B) are views showing a recording medium 2 which is used in the medium processing apparatus 1 in FIG. 1. FIG. 2(A) is a view showing a front face 2a of a recording medium 2 and FIG. 2(B) is a view showing a back face 2b of the recording medium 2. FIG. 3 is a block diagram showing a control section 5 and structures relating to the control section 5 of the medium processing apparatus 1 in FIG. 1.

The medium processing apparatus 1 in this embodiment is, for example, an apparatus which is mounted for use on an automatic ticket gate machine installed in a ticket barrier of a station. The medium processing apparatus 1 performs reading of magnetic data recorded on a card-shaped recording medium 2 such as a railway ticket, writing of magnetic data to the recording medium 2, and printing of characters to the recording medium 2. The medium processing apparatus 1 includes, as shown in FIG. 1, a magnetic data processing part 3 which performs reading and writing processing of magnetic data, and a print processing part 4 which performs character print processing. Further, the medium processing apparatus 1 includes, as shown in FIG. 3, a control section 5 which controls the medium processing apparatus 1. The control section 5 is connected with a host control section 6 which controls a host apparatus such as an automatic ticket gate machine on which the medium processing apparatus 1 is mounted.

In the following descriptions, three directions perpendicular to each other are referred to as an "X" direction, a "Y" direction and a "Z" direction. In this embodiment, the "Z" direction is coincided with an upper and lower direction. Further, the "Y" direction is a right and left direction, the "X" direction is a front and rear direction, an "X1" direction side is a "front" side, and an "X2" direction side is a "rear" (back) side.

A lower end of the print processing part 4 is connected with a rear end of the magnetic data processing part 3 and the medium processing apparatus 1 is formed so that its shape when viewed in right and left direction is a roughly an "L" shape. An insertion port 8 into which a recording medium 2 is inserted is formed at a front end of the magnetic data processing part 3 and an eject port 9 from which the recording medium 2 is ejected is formed at an upper end of the print processing part 4. Further, in the magnetic data processing part 3, a recording medium 2 is conveyed toward the rear direction and the recording medium 2 is conveyed toward a substantially upper direction in the print processing part 4.

A recording medium 2 is, for example, a card made of paper having a predetermined thickness and is formed in a rectangular shape. A front face 2a of a recording medium 2 is formed with a print part on which printing is performed by a thermal method. Further, a back face 2b of the recording medium 2 is formed with a magnetic stripe 2c in which magnetic data are recorded. The magnetic stripe 2c is formed over the entire face of the back face 2b. The magnetic stripe 2c in this embodiment is recorded with three tracks of magnetic data.

The magnetic data processing part 3 includes a medium taking-in part 11 which is structured to take a recording medium 2 into the magnetic data processing part 3, and a magnetic data reading/writing part 12 for performing reading and writing of magnetic data. The medium taking-in part 11 is disposed on a front side with respect to the magnetic data reading/writing part 12. A medium conveying passage 13 through which a recording medium 2 is conveyed is formed in an inside of the magnetic data processing part 3.

As described above, in the magnetic data processing part 3, a recording medium 2 is conveyed toward a rear direction. Specifically, in the magnetic data processing part 3, a recording medium 2 is conveyed toward a rear direction so that its length direction (longitudinal widthwise direction) is set to be parallel to the front and rear direction. In other words, in the magnetic data processing part 3, the front and rear direction (specifically, rear direction) is a conveyance direction of a recording medium 2, and the upper and lower direction is a thickness direction of the recording medium 2 which is passed through the medium conveying passage 13. Further, in the magnetic data processing part 3, a front side ("X1" direction side) is an upstream side in the conveyance direction of a recording medium 2, and a rear side ("X2" direction side) is a downstream side in the conveyance direction of the recording medium 2. Further, the right and left direction is a widthwise direction (short widthwise direction) of a recording medium 2 which is perpendicular to a thickness direction of the recording medium 2 and the conveyance direction of the recording medium 2.

The medium taking-in part 11 includes a shutter member 14 for closing the insertion port 8, a taking-in roller 15 for taking a recording medium 2 inserted into the insertion port 8 into the inside, a pre-head 16 as a detection mechanism for detecting that the recording medium 2 is inserted into the medium processing apparatus 1 through the insertion port 8 in a state whether its front face 2a faces upward or its back face 2b faces upward, and a sensor 17 for detecting that the recording medium 2 is inserted into the insertion port 8. The sensor 17 is disposed on the front side with respect to the shutter member 14 in the front and rear direction. Further, as shown in FIG. 3, the pre-head 16 and the sensor 17 are connected with the control section 5.

The shutter member 14 is connected with a solenoid 18 through a power transmission mechanism such as a link mechanism. The shutter member 14 is moved up and down by power of the solenoid 18. In this embodiment, when power is not supplied to the solenoid 18, the shutter member 14 is moved upward to close the insertion port 8 and, when power is supplied to the solenoid 18, the shutter member 14 is moved downward to open the insertion port 8. The solenoid 18 is, as shown in FIG. 3, connected with the control section 5.

The taking-in roller 15 is, for example, disposed so as to face the medium conveying passage 13 from a lower side with respect to the medium conveying passage 13. The taking-in roller 15 is connected with a motor 65 described below through a power transmission mechanism such as a pulley and a belt. A pad roller 19 is oppositely disposed to the taking-in roller 15 from an upper side. The pad roller 19 is urged toward the taking-in roller 15. The taking-in roller 15 and the pad roller 19 are disposed on the rear side with respect to the shutter member 14 in the front and rear direction.

The pre-head 16 is disposed so as to face the medium conveying passage 13 from a lower side with respect to the medium conveying passage 13. Further, the center of the pre-head 16 in the right and left direction is disposed on the center line of the medium conveying passage 13 in the right and left direction. A pad roller 20 is oppositely disposed to the pre-head 16 from an upper side. The pad roller 20 is urged toward the pre-head 16. The Pre-head 16 and the pad roller 20 are disposed on the rear side with respect to the taking-in roller 15 and the pad roller 19 in the front and rear direction.

When a recording medium 2 is inserted into the insertion port 8 in a state that its front face 2a faces upward, a magnetic stripe 2c on the back face 2b of the recording medium 2 is contacted with the pre-head 16 and thus a magnetic signal is outputted from the pre-head 16. On the other hand, when a recording medium 2 is inserted into the insertion port 8 in a state that its back face 2b faces upward, a magnetic signal is not outputted from the pre-head 16 even when the pre-head 16 is contacted with the recording medium 2. In this embodiment, it is detected whether an under face of an inserted recording medium 2 is provided with a magnetic stripe 2c or not based on a magnetic signal which is outputted from the pre-head 16. Further, it is detected whether a recording medium 2 is inserted into the insertion port 8 in a state that its front face 2a faces upward or its back face 2b faces upward by detecting existence/absence of the magnetic stripe 2c by the pre-head 16. The pre-head 16 in this embodiment is a three-channel type magnetic head and is capable of reading magnetic data of three tracks which are recorded in the magnetic stripe 2c. In accordance with an embodiment of the present invention, the pre-head 16 may be a one-channel type magnetic head.

The magnetic data reading/writing part 12 includes a magnetic head part 31 having magnetic heads 24 and 25, a magnetic head part 32 having magnetic heads 26 and 27, a magnetic head part 33 having magnetic heads 28 and 29, and a conveying mechanism 34 for conveying a recording medium 2. A detailed structure of the magnetic data reading/writing part 12 will be described below.

The print processing part 4 includes thermal heads 36 and 37 for performing printing on a print part of a front face 2a of a recording medium 2, a first thermal head moving mechanism 38 for moving the thermal head 36 and a second thermal head moving mechanism 39 for moving the thermal head 37. An inside of the print processing part 4 is formed with a medium conveying passage 40 through which a recording medium 2 is conveyed. A detailed structure of the print processing part 4 will be described below.

In this embodiment, as described above, a recording medium 2 is conveyed toward a substantially upper direction in the print processing part 4. Therefore, in the print processing part 4, a substantially upper and lower direction (specifically, substantially upper direction) is a conveyance direction for a recording medium 2 in the print processing part 4 and a substantially front and rear direction is a thickness direction of a recording medium 2 which is passed through the medium conveying passage 40. Further, in the print processing part 4, a substantially lower side is an upstream side in the conveyance direction for a recording medium 2, and a substantially upper side is a downstream side in the conveyance direction for the recording medium 2.

(Structure of Magnetic Data Reading/Writing Part)

FIG. 4(A) is a side view showing the magnetic head parts 31 through 33, the first pad roller moving mechanism 51 and the second pad roller moving mechanism 52 shown in FIG. 1, and FIG. 4(B) is a plan view showing the magnetic head parts 31 through 33 in FIG. 1. FIGS. 5(A) and 5(B) are views for explaining operations of the magnetic head parts 31 through 33 shown in FIG. 1.

The magnetic data reading/writing part 12 includes, as described above, the magnetic head parts 31 through 33 and the conveying mechanism 34. The magnetic head parts 31 and 33 include pad rollers 45 through 50 which are oppositely disposed to the respective magnetic heads 24 through 29. Further, the magnetic data reading/writing part 12 includes a first pad roller moving mechanism 51 which moves the pad rollers 45, 47 and 49, and a second pad roller moving mechanism 52 which moves the pad rollers 46, 48 and 50. The magnetic head parts 31 through 33 are disposed in this order from the front side toward the rear side with a predetermined distance therebetween.

The magnetic head part 31 includes, as described above, the magnetic heads 24 and 25 and the pad rollers 45 and 46. The magnetic head 24 is disposed so as to face the medium conveying passage 13 from a lower side with respect to the medium conveying passage 13, and the magnetic head 25 is disposed so as to face the medium conveying passage 13 from an upper side with respect to the medium conveying passage 13. In this embodiment, the magnetic heads 24 and 25 are disposed at positions so as to be capable of always contacting with a recording medium 2 passing through the medium conveying passage 13. Further, in the front and rear direction, the magnetic head 25 is disposed on a rear side with respect to the magnetic head 24. Further, the centers of the magnetic heads 24 and 25 in the right and left direction are disposed on the center line "CL" of the medium conveying passage 13 in the right and left direction (see FIG. 4(B)).

The magnetic heads 24 and 25 are a reading head for reading magnetic data recorded in a magnetic stripe 2c of a recording medium 2. Further, the magnetic heads 24 and 25 are a three-channel type magnetic head which is provided with three channels corresponding to magnetic data of three tracks recorded in the magnetic stripe 2c. The magnetic heads 24 and 25 are connected with the control section 5 as shown in FIG. 3.

The pad roller 45 is oppositely disposed to the magnetic head 24 from an upper side and is urged to the magnetic head 24 by an urging member (not shown). The pad roller 46 is oppositely disposed to the magnetic head 25 from a lower side and is urged to the magnetic head 25 by an urging member (not shown).

The magnetic head part 32 includes, as described above, the magnetic heads 26 and 27 and the pad rollers 47 ad 48. The magnetic head 26 is disposed so as to face the medium conveying passage 13 from a lower side with respect to the medium conveying passage 13, and the magnetic head 27 is disposed so as to face the medium conveying passage 13 from an upper side with respect to the medium conveying passage 13. In this embodiment, the magnetic heads 26 and 27 are disposed at positions so as to be capable of always contacting with a recording medium 2 passing through the medium conveying passage 13. Further, in the front and rear direction, the magnetic head 27 is disposed on a rear side with respect to the magnetic head 26. Further, the centers of the magnetic heads 26 and 27 in the right and left direction are disposed on the center line "CL" of the medium conveying passage 13 in the right and left direction.

The magnetic heads 26 and 27 are a writing head which performs writing magnetic data in a magnetic stripe 2c of a recording medium 2. Further, the magnetic heads 26 and 27 are a three-channel type magnetic head which is provided with three channels corresponding to magnetic data of three tracks recorded in the magnetic stripe 2c. The magnetic heads 26 and 27 are connected with the control section 5 as shown in FIG. 3.

The pad roller 47 is oppositely disposed to the magnetic head 26 from an upper side and is urged to the magnetic head 26 by an urging member (not shown). The pad roller 48 is oppositely disposed to the magnetic head 27 from a lower side and is urged to the magnetic head 27 by an urging member (not shown).

The magnetic head part 33 includes, as described above, the magnetic heads 28 and 29 and the pad rollers 49 ad 50. The magnetic head 28 is disposed so as to face the medium conveying passage 13 from a lower side with respect to the medium conveying passage 13 and the magnetic head 29 is disposed so as to face the medium conveying passage 13 from an upper side with respect to the medium conveying passage 13. In this embodiment, the magnetic heads 28 and 29 are disposed at positions so as to be capable of always contacting with a recording medium 2 passing through the medium conveying passage 13. Further, in the front and rear direction, the magnetic head 29 is disposed on a rear side with respect to the magnetic head 28. Further, the centers of the magnetic heads 28 and 29 in the right and left direction are disposed on the center line "CL" of the medium conveying passage 13 in the right and left direction.

The magnetic heads 28 and 29 are a verifying head which reads magnetic data written in the magnetic stripe 2c of the recording medium 2 by the magnetic heads 26 and 27 to verify whether the magnetic data are appropriately written in the magnetic stripe 2c or not. Further, the magnetic heads 28 and 29 are a three-channel type magnetic head which is provided with three channels corresponding to magnetic data of three tracks recorded in the magnetic stripe 2c. The magnetic heads 28 and 29 are connected with the control section 5 as shown in FIG. 3.

The pad roller 49 is oppositely disposed to the magnetic head 28 from an upper side and is urged to the magnetic head 26 by an urging member (not shown). The pad roller 50 is oppositely disposed to the magnetic head 29 from a lower side and is urged to the magnetic head 29 by an urging member (not shown).

As shown in FIG. 4(A), a distance "L1" in the front and rear direction between the magnetic head 24 and the magnetic head 25 (specifically, a distance between a gap of the magnetic head 24 and a gap of the magnetic head 25), a distance "L2" in the front and rear direction between the magnetic head 26 and the magnetic head 27 (specifically, a distance between a gap of the magnetic head 26 and a gap of the magnetic head 27), and a distance "L3" in the front and rear direction between the magnetic head 28 and the magnetic head 29 (specifically, a distance between a gap of the magnetic head 28 and a gap of the magnetic head 29) are set to be substantially equal to each other.

Further, the distances "L1" through "L3" are set to be shorter than a length "L4" of a recorded range 2d of magnetic data in the magnetic stripe 2c (see FIG. 2(B)). For example, the distances "L1" through "L3" are set to be about $\frac{1}{4}$-$\frac{1}{5}$ of the length "L4". Further, in this embodiment, as shown in FIG. 4(B), when viewed in the upper and lower direction, the magnetic heads 24 and 25 are disposed so that a rear end of the pad roller 45 oppositely disposed to the magnetic head 24 and a front end of the pad roller 46 oppositely disposed to the magnetic head 25 are overlapped with each other, and the magnetic heads 26 and 27 are disposed so that a rear end of the pad roller 47 oppositely disposed to the magnetic head 26 and a front end of the pad roller 48 oppositely disposed to the magnetic head 27 are overlapped with each other, and the magnetic heads 28 and 29 are disposed so that a rear end of the pad roller 49 oppositely disposed to the magnetic head 28 and a front end of the pad roller 50 oppositely disposed to the magnetic head 29 are overlapped with each other.

In this embodiment, a distance in the front and rear direction between the magnetic head 25 and the magnetic head 26, and a distance in the front and rear direction between the magnetic head 27 and the magnetic head 28 are set to be longer than a length of the recording medium 2 (width in the longitudinal direction). Alternatively, it is preferable that the distances are longer than a length of the recording medium 2 (width in the longitudinal direction). Further, a distance between the magnetic head 24 and the magnetic head 26, a distance between the magnetic head 26 and the magnetic head 28, a distance between the magnetic head 25 and the magnetic head 27, and a distance between the magnetic head 27 and the magnetic head 29 in the front and rear direction are set to be longer than a distance "L5" from one end 2e of the recording medium 2 (see FIG. 2(B)) to the other end of the recorded range 2d of the magnetic stripe 2c, and a distance "L6" from the other end 2f of the recording medium 2 (see FIG. 2(B)) to one end of the recorded range 2d of the magnetic stripe 2c.

The first pad roller moving mechanism 51 includes three lever members 54 which turnably support respective pad rollers 45, 47 and 49, a solenoid 55, and a connection member 56 which is connected with a plunger 55a of the solenoid 55. The lever member 54 is turnably supported by a frame of the magnetic data reading/writing part 12. Further, the lever member 54 is turnably connected with the connection member 56. The solenoid 55 is connected with the control section 5 as shown in FIG. 3.

In this embodiment, the pad rollers 45, 47 and 49 are moved by an operation of the solenoid 55 between contact positions 45A, 47A and 49A where the pad rollers 45, 47 and 49 are capable of contacting with a recording medium 2 passing through the medium conveying passage 13 as shown in FIG. 5(A), and retreated positions 45B, 47B and 49B where the pad rollers 45, 47 and 49 are retreated in a direction separated from the medium conveying passage 13 (in other words, upper direction) as shown in FIG. 5(B).

More specifically, in this embodiment, when the plunger 55a of the solenoid 55 is retreated, as shown in FIG. 5(A), the pad rollers 45, 47 and 49 are located at the contact positions (first contact position) 45A, 47A and 49A where the pad rollers 45, 47 and 49 are capable of contacting with a recording medium 2 passing through the medium conveying passage 13. On the other hand, when the plunger 55a of the solenoid 55 is protruded, as shown in FIG. 5(B), the pad rollers 45, 47 and 49 are located at the retreated positions (first retreated position) 45B, 47B and 49B where the pad rollers 45, 47 and 49 are retreated in a separated direction (in other words, upper direction) from the medium conveying passage 13. In other words, the first pad roller moving mechanism 51 moves the pad rollers 45, 47 and 49 together between the contact positions 45A, 47A and 49A and the retreated positions 45B, 47B and 49B.

The second pad roller moving mechanism 52 includes, similarly to the first pad roller moving mechanism 51, three lever members 57 which turnably support respective pad rollers 46, 48 and 50, a solenoid 58, and a connection member 59 which is connected with a plunger 58a of the solenoid 58. The lever member 57 is turnably supported by a frame of the magnetic data reading/writing part 12. Further, the lever member 57 is turnably connected with the connection member 59. The solenoid 58 is connected with the control section 5 as shown in FIG. 3.

In this embodiment, the pad rollers 46, 48 and 50 are moved by an operation of the solenoid 58 between contact positions 46A, 48A and 50A where the pad rollers 46, 48 and 50 are capable of contacting with a recording medium 2 passing through the medium conveying passage 13 as shown in FIG. 5(B), and retreated positions 46B, 48B and 50B where the pad rollers 46, 48 and 50 are retreated in a direction separated from the medium conveying passage 13 (in other words, lower direction) as shown in FIG. 5(A).

More specifically, in this embodiment, when the plunger 58a of the solenoid 58 is retreated, as shown in FIG. 5(B), the pad rollers 46, 48 and 50 are located at the contact positions (second contact position) 46A, 48A and 50A where the pad rollers 46, 48 and 50 are capable of contacting with a recording medium 2 passing through the medium conveying passage 13. On the other hand, when the plunger 58a of the solenoid 58 is protruded, as shown in FIG. 5(A), the pad rollers 46, 48 and 50 are located at the retreated positions (second retreated position) 46B, 48B and 50B where the pad rollers 46, 48 and 50 are retreated in a separated direction (in other words, lower direction) from the medium conveying passage 13. In other words, the second pad roller moving mechanism 52 moves the pad rollers 46, 48 and 50 together between the contact positions 46A, 48A and 50A and the retreated positions 46B, 48B and 50B.

The magnetic heads 24, 26 and 28 in this embodiment are the first magnetic head, the magnetic heads 25, 27 and 29 are the second magnetic head, the pad rollers 45, 47 and 49 are the first pad rollers, and the pad rollers 46, 48 and 50 are the second pad rollers. Further, the magnetic head part 31 is the first magnetic head part in which both of the magnetic head 24 and the magnetic head 25 are a reading head, and the magnetic head part 32 is the second magnetic head part in which both of the magnetic head 26 and the magnetic head 27 are a writing head. Further, the first pad roller moving mechanism 51 is the first moving mechanism which moves the pad rollers 45, 47 and 49 between the contact positions 45A, 47A and 49A and the retreated positions 45B, 47B and 49B, and the second pad roller moving mechanism 52 is the second moving mechanism which moves the pad rollers 46, 48 and 50 between the contact positions 46A, 48A and 50A and the retreated positions 46B, 48B and 50B.

The conveying mechanism 34 includes, as shown in FIG. 1, a belt 61 which contacts with an upper face of a recording medium 2 to convey the recording medium 2, a belt 62 which contacts with an under face of the recording medium 2 to convey the recording medium 2, a plurality of pulleys 63 over which the belt 61 is stretched, and a plurality of pulleys 64 over which the belt 62 is stretched. The pulleys 63 and 64 are connected with a motor 65 through a power transmission mechanism such as a belt and a pulley not shown. The motor 65 is connected with the control section 5 as shown in FIG. 3.

(Structure of Print Processing Part)

Figure 7A:
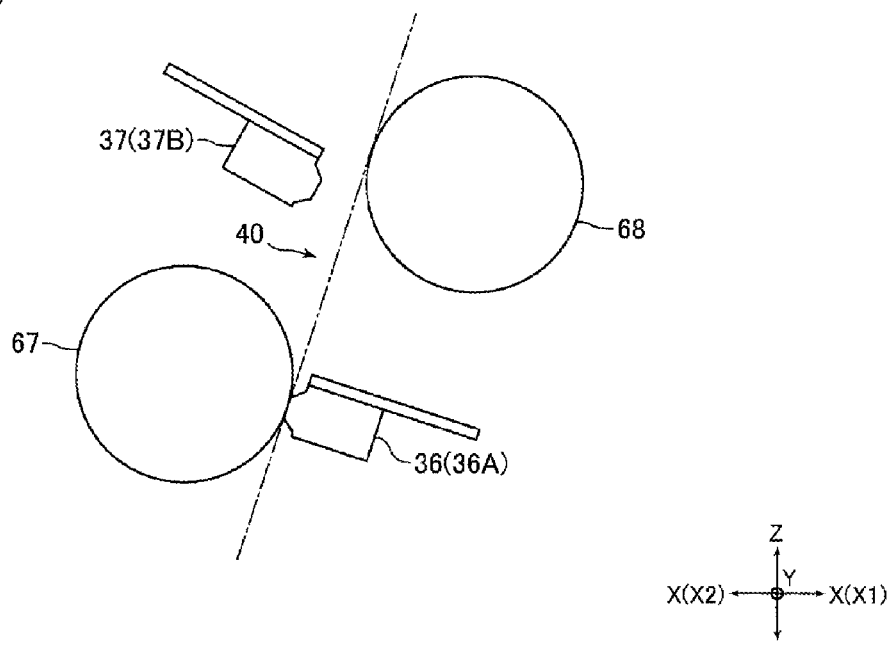
FIGS. 7(A) and 7(B) are views for explaining operations of thermal heads shown in FIG. 6.
Figure 7B:
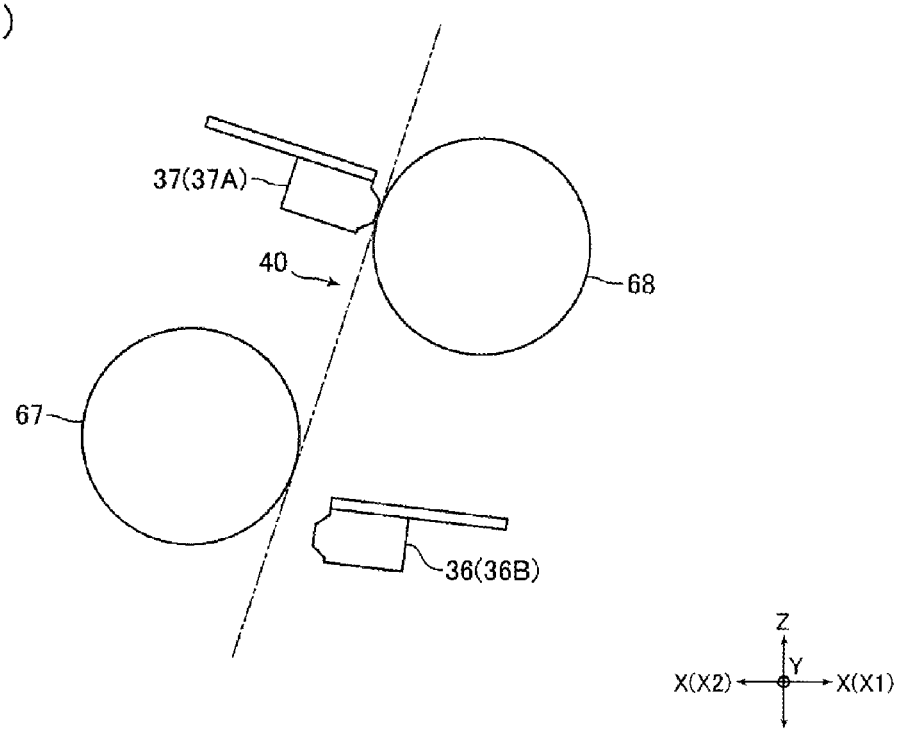

FIG. 6 is a side view showing a structure of a principal part of the print processing part 4 shown in FIG. 1. FIGS. 7(A) and 7(B) are views for explaining operations of the thermal heads 36 and 37 shown in FIG. 6.

The print processing part 4 includes, in addition to the thermal heads 36 and 37, the first thermal head moving mechanism 38 and the second thermal head moving mechanism 39, platen rollers 67 and 68 which are respectively oppositely disposed to the thermal heads 36 and 37, and an eject roller 69 for ejecting a recording medium 2 from an eject port 9.

Widths of the thermal heads 36 and 37 (width in the right and left direction) are set to be substantially equal to the width (short width) of a recording medium 2. The thermal head 36 is disposed on a lower side with respect to the thermal head 37. Further, the thermal head 36 is disposed so as to face the medium conveying passage 40 from a roughly front side with respect to the medium conveying passage 40, and the thermal head 37 is disposed so as to face the medium conveying passage 40 from a roughly rear side with respect to the medium conveying passage 40. The thermal heads 36 and 37 are connected with the control section 5 as shown in FIG. 3. The platen roller 67 is oppositely disposed to the thermal head 36 from a roughly rear side and the platen roller 68 is oppositely disposed to the thermal head 37 from a roughly front side. The platen rollers 67 and 68 are connected with the motor 65 through a power transmission mechanism such as a pulley and a belt. Further, the platen rollers 67 and 68 are disposed at positions so as to be capable of always contacting with a recording medium 2 passing through the medium conveying passage 40.

The first thermal head moving mechanism 38 includes a head fixing member 70 to which the thermal head 36 is fixed, and a solenoid 71 which is connected with the head fixing member 70. The head fixing member 70 is turnably supported by a frame of the print processing part 4. The solenoid 71 is connected with the control section 5 as shown in FIG. 3. The first thermal head moving mechanism 38 moves the thermal head 36 between a contact position 36A, at which the thermal head 36 is capable of contacting with a recording medium 2 as shown in FIG. 7(A), and a retreated position 36B at which the thermal head 36 is retreated from the medium conveying passage 40 as shown in FIG. 7(B).

More, specifically, in this embodiment, the thermal head 36 is moved by an operation of the solenoid 71 between a contact position (first contact position) 36A at which the thermal head 36 is capable of contacting with a recording medium 2 as shown in FIG. 7(A) and a retreated position (first retreated position) 36B at which the thermal head 36 is retreated from the medium conveying passage 40 as shown in FIG. 7(B). In other words, the first thermal head moving mechanism 38 moves the thermal head 36 between the contact position 36A and the retreated position 36B.

The second thermal head moving mechanism 39 includes a head fixing member 72 to which the thermal head 37 is fixed, and a solenoid 73 which is connected with the head fixing member 72. The head fixing member 72 is turnably supported by a frame of the print processing part 4. The solenoid 73 is connected with the control section 5 as shown in FIG. 3. The second thermal head moving mechanism 39 moves the thermal head 37 between a contact position 37A, at which the thermal head 37 is capable of contacting with a recording medium 2 as shown in FIG. 7(B), and a retreated position 37B at which the thermal head 37 is retreated from the medium conveying passage 40 as shown in FIG. 7(A).

More, specifically, in this embodiment, the thermal head 37 is moved by an operation of the solenoid 73 between a contact position (second contact position) 37A at which the thermal head 37 is capable of contacting with a recording medium 2 as shown in FIG. 7(B) and a retreated position (second retreated position) 37B at which the thermal head 37 is retreated from the medium conveying passage 40 as shown in FIG. 7(A). In other words, the second thermal head moving mechanism 39 moves the thermal head 37 between the contact position 37A and the retreated position 37B.

The thermal head 36 in this embodiment is the first thermal head and the thermal head 37 is the second thermal head. Further, the first thermal head moving mechanism 38 in this embodiment is the first moving mechanism, which moves the thermal head 36 that is the first thermal head between the contact position 36A and the retreated position 36B, and the second thermal head moving mechanism 39 is the second moving mechanism which moves the thermal head 37 that is the second thermal head between the contact position 37A and the retreated position 37B.

The eject roller 69 is, for example, is disposed so as to face the medium conveying passage 40 from a roughly front side with respect to the medium conveying passage 40. The eject roller 69 is connected with the motor 65 through a power transmission mechanism such as a pulley and a belt. A pad roller 74 is oppositely disposed to the eject roller 69 from a rear side. The pad roller 74 is urged toward the eject roller 69.

In this embodiment, a sensor 75 is disposed on a lower side with respect to the thermal head 36 for determining start timing of printing characters by the thermal heads 36 and 37 (see FIG. 1).

(Schematic Operation of Medium Processing Apparatus)

Figure 8:
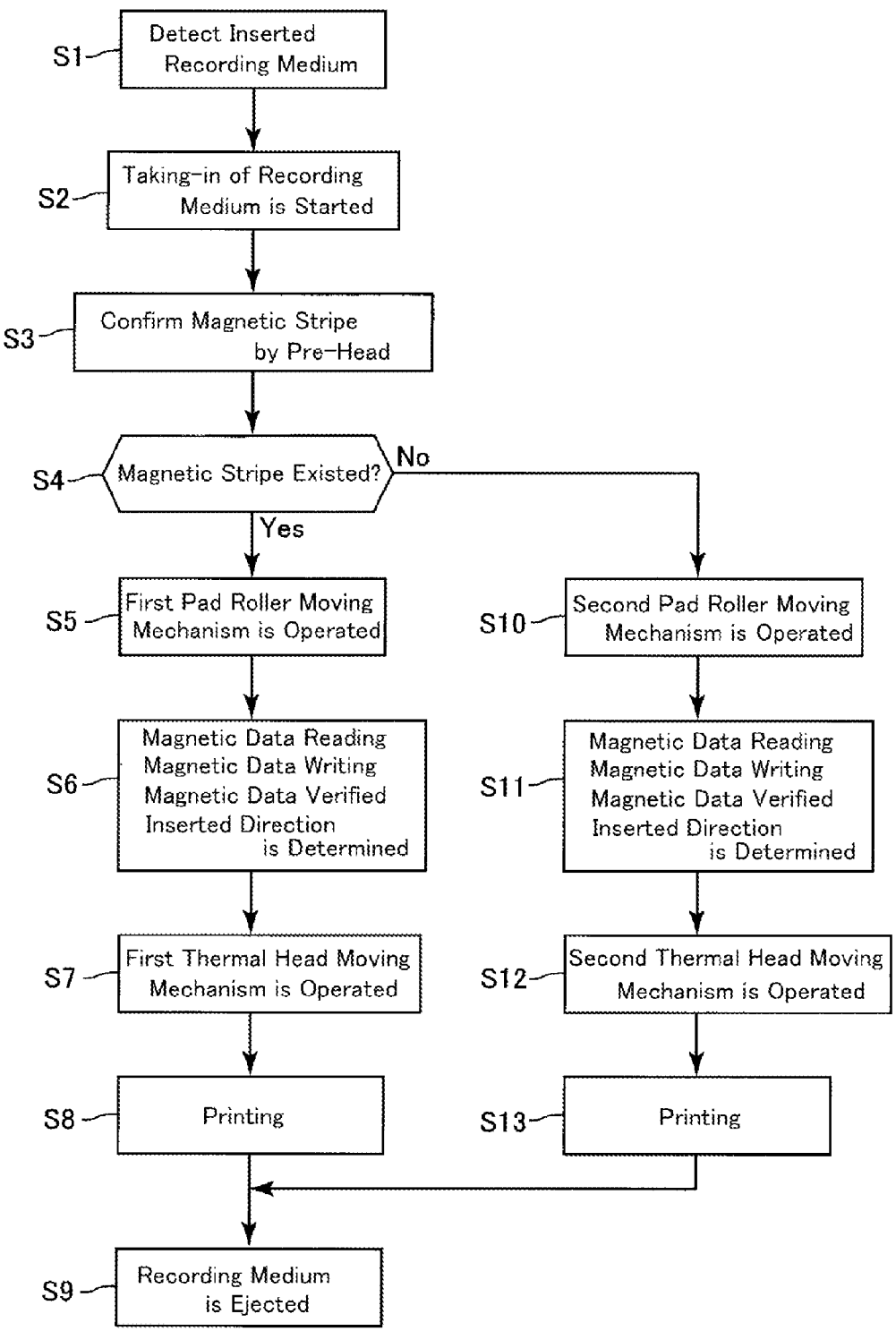
[FIG. 8]

FIG. 8 is a flow chart for explaining a schematic operation of the medium processing apparatus 1 shown in FIG. 1.

In the medium processing apparatus 1 structured as described above, when the power supply is in an "ON" state and the apparatus 1 is in a standby state that a recording medium 2 is to be inserted, the shutter member 14 is lowered and the insertion port 8 is opened. Further, in a standby state, all of the pad rollers 45 through 50 are located at the retreated position 45B through 50B and the thermal heads 36 and 37 are also located at the retreated positions 36B and 37B.

In this state, when it is detected by the sensor 17 that a recording medium 2 is inserted into the insertion port 8 (step S1), the control section 5 drives the taking-in roller 15, the conveying mechanism 34 and the like to start a taking-in operation of the recording medium 2 to the medium processing apparatus 1 (step S2). Further, the control section 5 confirms whether a magnetic stripe 2*c* is existed on an under face of the inserted recording medium 2 or not based on a magnetic signal outputted from the pre-head 16 (step S3). In other words, in the step S3, the control section 5 determines whether a recording medium 2 is inserted through the insertion port 8 to be taken into the medium conveying passage 13 in a state that its front face 2*a* faces upward or its back face 2*b* faces upward. A sensor not shown is disposed on a rear side with respect to the pre-head 16 and, when a recording medium 2 is detected by the sensor, the control section 5 confirms whether an under face of the inserted recording medium 2 is provided with a magnetic stripe 2*c* or not in the step S3.

In a case that a recording medium 2 is inserted into the insertion port 8 in a state that its front face 2*a* faces upward and, as a result of confirmation in the step S3, the magnetic stripe 2*c* is existed on the under face of the inserted recording medium 2 ("Yes" in the step S4), the control section 5 drives the solenoid 55 to operate the first pad roller moving mechanism 51 (step S5). Specifically, the control section 5 moves the pad rollers 45, 47 and 49 located at the retreated positions 45B, 47B and 49B to the contact positions 45A, 47A and 49A as shown in FIG. 5(A) in the step S5.

When a recording medium 2 is conveyed by the conveying mechanism 34 in a state that the pad rollers 45, 47 and 49 are located at the contact positions 45A, 47A and 49A, first, magnetic data recorded in the magnetic stripe 2*c* of the recording medium 2 are read by the magnetic head 24. After that, magnetic data are written in the magnetic stripe 2*c* by the magnetic head 26 and then, magnetic data written in the magnetic stripe 2*c* by the magnetic head 26 are read by the magnetic head 28 to be verified whether the magnetic data are appropriately written in the magnetic stripe 2*c* or not (step S6). In the step S6, the magnetic data read by the magnetic head 24 is transmitted from the control section 5 to the host control section 6 and, based on the transmitted magnetic data, magnetic data to be written in the magnetic stripe 2*c* are created in the host control section 6. The created magnetic data are transmitted from the host control section 6 to the control section 5 and then transmitted to the magnetic head 26 from the control section 5 and written in the magnetic stripe 2*c*.

In this embodiment, in the step S6, based on a reading result of the magnetic data by the magnetic head 24, the control section 5 determines whether the recording medium 2 is inserted into the medium processing apparatus 1 from its one end 2*e* side or the recording medium 2 is inserted into the medium processing apparatus 1 from the other end 2*f* side.

More specifically, a reading result of magnetic data by the magnetic head 24 when the recording medium 2 is inserted into the medium processing apparatus 1 (when the recording medium 2 is taken into the medium conveying passage 13) from its one end 2*e* (see FIG. 2(B)) side is different from a reading result of magnetic data when inserted into the medium processing apparatus 1 (when taken into the medium conveying passage 13) from the other end 2*f* (see FIG. 2(B)) side. Therefore, in the step S6, based on the reading result of magnetic data by the magnetic head 24, the control section 5 determines whether the recording medium 2 is inserted into the medium processing apparatus 1 from its one end 2*e* side or from the other end 2*f* side. In other words, in the step S6, the control section 5 determines the inserting direction of the recording medium 2.

After that, the control section 5 drives the solenoid 71 to operate the first thermal head moving mechanism 38 (step S7). Specifically, the control section 5 moves the thermal head 36 located at the retreated position 36B to the contact position 36A in the step S7. When the recording medium 2 is conveyed by the platen rollers 67 and 68 and the like in a state that the thermal head 36 is located at the contact position 36A, printing of characters is performed on the front face 2a of the recording medium 2 by the thermal head 36 (step S8).

As described above, in the step S6, it is determined whether the recording medium 2 is inserted into the medium processing apparatus 1 from its one end 2e side or the recording medium 2 is inserted into the medium processing apparatus 1 from the other end 2f side. In the step S8, based on the determined result in the step S6, the control section 5 performs conveyance control for the recording medium 2 and temperature control of the thermal head 36 and the like so that printing of characters is performed at an appropriate position on the front face 2a of the recording medium 2. For example, in a case that printing is performed in a region 2g shown by the two-dot chain line in FIG. 2(A), based on the determined result in the step S6, the control section 5 controls a conveying amount of the recording medium 2 after the recording medium 2 is detected by the sensor 75 and a heating time of the thermal head 36 and the like in the step S8.

More specifically, as described above, in the step S6, it has been determined whether the recording medium 2 is inserted into the medium processing apparatus 1 from either side of the one end 2e side or the other end 2f side. In the step S8, the control section 5 performs printing by the thermal head 36 so that printing of characters is performed at an appropriate position on the front face 2a of the recording medium 2 while performing conveyance control for the recording medium 2, temperature control of the thermal head 36 and the like based on the determined result in the step S6. For example, in a case that printing is performed in the region 2g shown by the two-dot chain line in FIG. 2(A), according to whether the recording medium 2 is inserted into the medium processing apparatus 1 from its one end 2e side or from the other end 2f side, a conveying amount of the recording medium 2 after the recording medium 2 is detected by the sensor 75, a region which is heated by the thermal head 36, a heating time and the like are different. Therefore, in the step S8, the control section 5 performs printing by the thermal head 36 while controlling the conveying amount of the recording medium 2 after the recording medium 2 is detected by the sensor 75, the heating region and the heating time of the thermal head 36 and the like on the basis of the determined result in the step S6.

When printing has been performed in the step S8, the recording medium 2 is ejected from the eject port 9 by the eject roller 69 and the like (step S9).

On the other hand, in a case that a recording medium 2 is inserted into the insertion port 8 in a state that its back face 2b faces upward and, as a result of confirmation in the step S3, the magnetic stripe 2c is not existed on the under face of the inserted recording medium 2 ("No" in the step S4), the control section 5 drives the solenoid 58 to operate the second pad roller moving mechanism 52 (step S10). Specifically, in the step S10, the control section 5 moves the pad rollers 46, 48 and 50 located at the retreated positions 46B, 48B and 50B to the contact positions 46A, 48A and 50A as shown in FIG. 5(B).

When the recording medium 2 is conveyed by the conveying mechanism 34 in a state that the pad rollers 46, 48 and 50 are located at the contact positions 46A, 48A and 50A, first, magnetic data recorded in the magnetic stripe 2c of the recording medium 2 are read by the magnetic head 25. After that, magnetic data are written in the magnetic stripe 2c by the magnetic head 27 and then, magnetic data written in the magnetic stripe 2c by the magnetic head 27 are read by the magnetic head 29 to be verified whether the magnetic data are appropriately written in the magnetic stripe 2c or not (step S11). In the step S11, similarly to the step S6, the magnetic data read by the magnetic head 25 are transmitted from the control section 5 to the host control section 6 and, based on the transmitted magnetic data, magnetic data to be written in the magnetic stripe 2c are created in the host control section 6. The created magnetic data are transmitted from the host control section 6 to the control section 5 and then transmitted to the magnetic head 27 from the control section 5 and written in the magnetic stripe 2c.

In this embodiment, in the step S11, based on a reading result of the magnetic data by the magnetic head 25, the control section 5 determines whether the recording medium 2 is inserted into the medium processing apparatus 1 from its one end 2e side or the recording medium 2 is inserted into the medium processing apparatus 1 from the other end 2f side.

In other words, a reading result of magnetic data by the magnetic head 25 when the recording medium 2 is inserted into the medium processing apparatus 1 from its one end 2e side is different from a reading result of magnetic data when inserted into the medium processing apparatus 1 from the other end 2f side. Therefore, similarly to the step S6, in the step S11, based on the reading result of magnetic data by the magnetic head 25, the control section 5 determines whether the recording medium 2 is inserted into the medium processing apparatus 1 from its one end 2e side or from the other end 2f side. In other words, in the step S11, the control section 5 determines the inserting direction of the recording medium 2.

In the step S11, similarly to the step S6, the magnetic data read by the magnetic head 25 are transmitted from the control section 5 to the host control section 6 and, based on the transmitted magnetic data, magnetic data to be written in the magnetic stripe 2c are created in the host control section 6. The created magnetic data are transmitted from the host control section 6 to the control section 5 and then transmitted to the magnetic head 27 from the control section 5 and written in the magnetic stripe 2c.

After that, the control section 5 drives the solenoid 73 to operate the second thermal head moving mechanism 39 (step S12). Specifically, the control section 5 moves the thermal head 37 located at the retreated position 37B to the contact position 37A in the step S12. When the recording medium 2 is conveyed by the platen rollers 67 and 68 and the like in a state that the thermal head 37 is located at the contact position 37A, printing is performed on the front face 2a of the recording medium 2 by the thermal head 37 (step S13).

As described above, in the step S11, it is determined whether the recording medium 2 is inserted into the medium processing apparatus 1 from its one end 2e side or the recording medium 2 is inserted into the medium processing apparatus 1 from the other end 2f side. Further, in the step S13, based on the determined result in the step S11, the control section 5 performs conveyance control for the recording medium 2 and temperature control and the like of the thermal head 37 so that printing is performed at an appropriate position on the front face 2a of the recording medium 2.

More specifically, as described above, in the step S11, it has been determined whether the recording medium 2 is inserted into the medium processing apparatus 1 from either side of the one end 2e side or the other end 2f side. In the step S13, similarly to the step S8, the control section 5 performs printing by the thermal head 37 so that printing of characters is performed at an appropriate position on the front face 2a of the recording medium 2 while performing conveyance control for the recording medium 2, temperature control of the thermal head 36 and the like based on the determined result in the step S11.

When printing of characters has been performed in the step S13, the flow is advanced to the step S9 and the recording medium 2 is ejected from the eject port 9 by the eject roller 69 and the like (step S9).

In accordance with an embodiment of the present invention, in a case that a relatively high quality is required for the printed characters on the front face 2a of a recording medium 2, after conveyance of the recording medium 2 is temporarily stopped, the thermal heads 36 and 37 are moved to the contact positions 36A and 37A in the steps S7 and S12. On the other hand, in a case that a relatively high quality is not required for the printed characters on the front face 2a of a recording medium 2, the thermal heads 36 and 37 are moved to the contact positions 36A and 37A while conveying the recording medium 2 in the steps S7 and S12.

Further, a sensor not shown is disposed on a front side with respect to the magnetic head 24 and, when a recording medium 2 taken into the medium processing apparatus 1 is detected by the sensor, the shutter member 14 is moved upward to close the insertion port 8. Further, when the recording medium 2 is ejected from the eject port 9, the shutter member 14 is moved downward and the insertion port 8 is opened.

The step S4 in this embodiment is a first taking-in direction determining step in which a recording medium 2 is determined to be taken into the medium conveying passage 13 in a state whether the front face 2a of the recording medium 2 faces the magnetic head 24 side or its back face 2b faces the magnetic head 24 side. The steps S6 and S11 are a second taking-in direction determining step in which the recording medium 2 is determined on the basis of a reading result of magnetic data from the magnetic head 24 or the magnetic head 25 whether the recording medium 2 is taken into the medium conveying passage 13 from its one end 2e side or from its other end 2f side of the recording medium 2. Further, the steps S7 and S12 are a thermal head moving step in which, based on a determined result in the step S4 that is the first taking-in direction determining step, the thermal head 36 is moved to the contact position 36A or the thermal head 37 is moved to the contact position 37A. The steps S8 and S13 are a printing step in which printing is performed on the recording medium 2 by the thermal head 36 or the thermal head 37 while performing temperature control of the thermal head 36 or the thermal head 37 having been moved in the step S7 or S12 that is the thermal head moving step and performing conveyance control for the recording medium 2 based on the determined result in the step S6 or S11 that is the second taking-in direction determining step.

(Principal Effects in this Embodiment)

As described above, the medium processing apparatus 1 is provided with the following principal effects.

In this embodiment, the magnetic heads 24, 26 and 28 are disposed so as to face the medium conveying passage 13 from a lower side with respect to the medium conveying passage 13, and the magnetic head 25, 27 and 29 are disposed so as to face the medium conveying passage 13 from an upper side with respect to the medium conveying passage 13. Therefore, even when a recording medium 2 is taken into the medium processing apparatus 1 in a state that its front face 2a faces upward or, even when the recording medium 2 is taken into the medium processing apparatus 1 in a state that its back face 2b faces upward, reading processing and writing processing of magnetic data can be performed on the recording medium 2 by the magnetic heads 24, 26 and 28 or the magnetic heads 25, 27 and 29 without reversing the recording medium 2 in the inside of the medium processing apparatus 1. Accordingly, in this embodiment, processing of a recording medium 2 can be performed at a high speed.

In this embodiment, a distance "L1" between the magnetic head 24 and the magnetic head 25 in the front and rear direction, a distance "L2" between the magnetic head 26 and the magnetic head 27 in the front and rear direction, and a distance "L3" between the magnetic head 28 and the magnetic head 29 in the front and rear direction are set to be shorter than a length "L4" of the recorded range 2d of magnetic data of the magnetic stripe 2c. Therefore, even when the magnetic heads 24, 26 and 28 and the magnetic heads 25, 27 and 29 are disposed so as to displace from each other in the front and rear direction, the distances "L1" through "L3" in the front and rear direction between the magnetic heads 24, 26 and 28 and the magnetic heads 25, 27 and 29 can be shortened to reduce the size of the medium processing apparatus 1 in the front and rear direction.

On the other hand, since the distances "L1" through "L3" are set to be shorter than the length "L4" of the recorded range 2d of magnetic data, when a recording medium 2 is entered into and sandwiched between the magnetic heads 25, 27 and 29 and the pad rollers 46, 48 and 50 at the time of performing reading and writing of magnetic data by the magnetic heads 24, 26 and 28 or, when the recording medium 2 comes out from between the magnetic heads 24, 26 and 28 and the pad rollers 45, 47 and 49 at the time of performing reading and writing of magnetic data by the magnetic heads 25, 27 and 29, the speed of the conveyed recording medium 2 may be varied to deteriorate the jitter.

However, in this embodiment, when reading and writing of magnetic data are performed by the magnetic heads 24, 26 and 28, the pad rollers 46, 48 and 50 are retreated and, when reading and writing of magnetic data are performed by the magnetic heads 25, 27 and 29, the pad rollers 45, 47 and 49 are retreated. Therefore, even when the distances "L1" through "L3" are set to be shorter than the length "L4" of the recorded range 2d of magnetic data, variation of the conveyance speed of a recording medium 2 at the time of performing reading and writing of magnetic data by the magnetic heads 24 through 29 is suppressed and deterioration of the jitter can be suppressed.

Further, in this embodiment, the distance between the magnetic head 24 and the magnetic head 26, the distance between the magnetic head 26 and the magnetic head 28, the distance between the magnetic head 25 and the magnetic head 27, and the distance between the magnetic head 27 and the magnetic head 29 in the front and rear direction are set to be longer than the distance "L5" from one end 2e of a recording medium 2 to the other end of the recorded range 2d of the magnetic stripe 2c and longer than the distance "L6" from the other end 2f of the recording medium 2 to one end of the recorded range 2d of the magnetic stripe 2c. Therefore, when reading and writing of magnetic data are performed by the magnetic heads 24 through 29, the recording medium 2 does not come out from between the magnetic heads 24 through 27 and the pad rollers 45 through 48, and the recording medium 2 does not enter into between the magnetic heads 26 through 29 and the pad rollers 47 through 50. Accordingly, in this embodiment, variation of the conveyance speed of a recording medium 2 at the time of performing reading and writing of magnetic data by the magnetic heads 24 through 29 is suppressed and deterioration of the jitter can be suppressed.

In this embodiment, the first pad roller moving mechanism 51 moves the pad rollers 45, 47 and 49 together between the contact positions 45A, 47A and 49A and the retreated positions 45B, 47B and 49B. Therefore, according to this embodiment, in comparison with a case that the pad rollers 45, 47 and 49 are moved individually, the structure of the first pad roller moving mechanism 51 can be simplified. Similarly, in this embodiment, the second pad roller moving mechanism 52 moves the pad rollers 46, 48 and 50 together between the contact positions 46A, 48A and 50A and the retreated positions 46B, 48B and 50B and thus, in comparison with a case that the pad rollers 46, 48 and 50 are moved individually, the structure of the second pad roller moving mechanism 52 can be simplified.

Next, the medium processing apparatus 1 is provided with the following principal effects.

As described above, in this embodiment, the control section 5 determines whether a recording medium 2 is taken into the medium processing apparatus 1 in a state that the front face 2a of the recording medium 2 faces upward or that its back face 2b faces upward on the basis of a detection result by the pre-head 16 and, based on the determined result, the thermal head 36 is arranged at the contact position 36A or the thermal head 37 is arranged at the contact position 37A. Further, in this embodiment, the control section 5 determines whether a recording medium 2 is taken into the medium processing apparatus 1 from either side of one end 2e side or the other end 2f side on the basis of a reading result of magnetic data by the magnetic head 24 or the magnetic head 25 and, based on the determined result, printing on the recording medium 2 is performed by the thermal head 36 or the thermal head 37 while performing temperature control of the thermal head 36 or the thermal head 37 and performing conveyance control for the recording medium 2.

Therefore, in this embodiment, even when a recording medium 2 is taken into the medium processing apparatus 1 in either state that the front face 2a of the recording medium 2 faces upward or its back face 2b faces upward and, even when the recording medium 2 is taken into the medium processing apparatus 1 from either side of one end 2e side or the other end 2f side of the recording medium 2, appropriate printing can be performed at a predetermined position of the recording medium 2. In other words, in this embodiment, even when a recording medium 2 is taken into the medium processing apparatus 1 in various postures, appropriate printing can be performed at a predetermined position of the recording medium 2.

(Other Embodiments)

Although the present invention has been shown and described with reference to a specific embodiment, various changes and modifications will be apparent to those skilled in the art from the teachings herein.

Figure 9A:
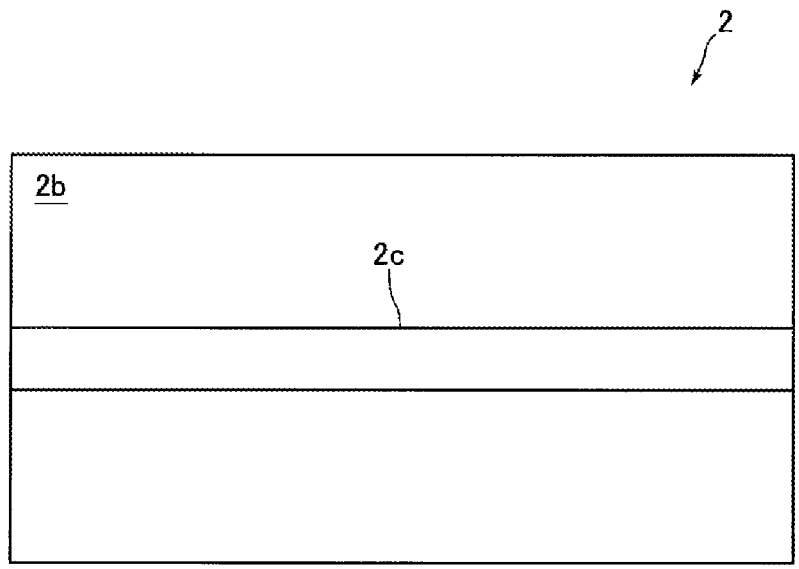
FIGS. 9(A) and 9(B) are views showing a back face of a recording medium in accordance with another embodiment of the present invention.
Figure 9B:
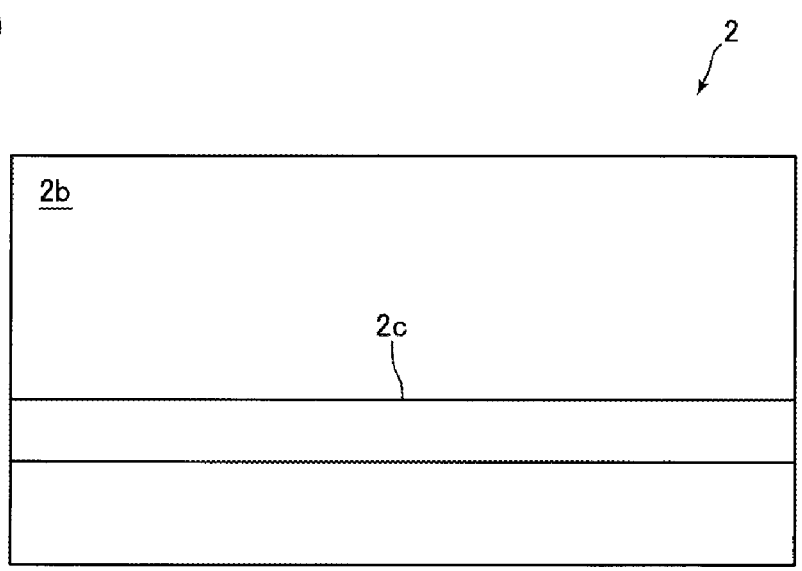

In the embodiment described above, the magnetic stripe 2c is formed over the entire surface of the back face 2b. However, the present invention is not limited to this embodiment. For example, as shown in FIG. 9(A), a magnetic stripe 2c having a width narrower than the width of a recording medium 2 may be formed at the center of the recording medium 2 in a widthwise direction of the recording medium 2. Alternatively, as shown in FIG. 9(B), the magnetic stripe 2c may be formed at a position displaced from the center of a recording medium 2 in a widthwise direction of the recording medium 2. In this case, as shown in FIG. 10, two magnetic head parts 31, two magnetic head parts 32 and two magnetic head parts 33 are disposed so as to interpose the center line "CL" of the medium conveying passage 13 in the right and left direction. In this case, two magnetic head parts 31, two magnetic head parts 32 and two magnetic head parts 33 may be respectively disposed at the same position in the front and rear direction as shown in FIG. 10, or may be disposed at positions displaced a little from each other in the front and rear direction. Also in this case, in comparison with a magnetic recording medium reading/writing apparatus described in the above-mentioned Patent Literature 2, the size of the apparatus can be reduced in the conveyance direction of a recording medium 2.

In accordance with an embodiment of the present invention, in a case that a magnetic stripe 2c is formed over the entire surface of the back face 2b or, in a case that a magnetic stripe 2c is formed at the center of a recording medium 2 in a widthwise direction of the recording medium 2, it is preferable that one magnetic head part 31, one magnetic head part 32 and one magnetic head part 33 are disposed so that the centers of the magnetic heads 24 through 29 are coincided with the center of the medium conveying passage 13 in the right and left direction. In these cases, the structure of the medium processing apparatus 1 can be simplified.

In the embodiment described above, in a standby state before a recording medium 2 is inserted into the medium processing apparatus 1, all of the pad rollers 45 through 50 are located at the retreated positions 45B through 50B. However, the present invention is not limited to this embodiment. For example, all of the pad rollers 45 through 50 may be located at the contact positions 45A through 50A in a standby state. In this case, in the above-mentioned step S5, the second pad roller moving mechanism 52 is operated to move the pad rollers 46, 48 and 50 located at the contact positions 46A, 48A and 50A to the retreated positions 46B, 48B and 50B and, in the above-mentioned step S10, the first pad roller moving mechanism 51 is operated to move the pad rollers 45, 47 and 49 located at the contact positions 45A, 47A and 49A to the retreated positions 45B, 47B and 49B.

Further, it may be structured that, in a standby state before a recording medium 2 is inserted into the medium processing apparatus 1, the pad rollers 45, 47 and 49 are located at the contact positions 45A, 47A and 49A, and the pad rollers 46, 48 and 50 are located at the retreated positions 46B, 48B and 50B. As described above, the magnetic stripe 2c is formed on the back face 2b of a recording medium 2. Further, a user who utilizes the automatic ticket gate machine commonly inserts a recording medium 2 into the medium processing apparatus 1 in a state that its front face 2a faces upward with a high degree of probability. Therefore, in this case, even when the first pad roller moving mechanism 51 and the second pad roller moving mechanism 52 are not operated, reading processing and writing processing can be performed on a recording medium 2 with a high degree of probability. Accordingly, in this case, the number of times of operation of the first pad roller moving mechanism 51 and the second pad roller moving mechanism 52 can be reduced and, as a result, wear and the like of components structuring the first pad roller moving mechanism 51 and wear and the like of components structuring the second pad roller moving mechanism 52 can be restrained.

Further, in this case, in a case that a magnetic stripe 2c is not detected by the pre-head 16, when the pad roller 46 is moved to the contact position 46A before the recording medium 2 is reached to the magnetic head 25, reading of magnetic data by the magnetic head 25 can be performed. In addition, when the pad roller 45 is moved to the retreated position 45B before the recording medium 2 comes out from between the magnetic head 24 and the pad roller 45, speed variation of the recording medium 2 at the time of reading magnetic data by the magnetic head 25 can be restrained to suppress deterioration of the jitter. In other words, in this case, even when a moving time of the pad roller 45 by the first pad roller moving mechanism 51 and a moving time of the pad roller 46 by the second pad roller moving mechanism 52 are long (in other words, even when an operating speed of the first pad roller moving mechanism 51 and an operating speed of the second pad roller moving mechanism 52 are slow), reading of magnetic data by the magnetic head 25 can be performed and deterioration of the jitter can be suppressed. Therefore, small solenoids 55 and 58 whose power is small can be used and, as a result, the structures of the first pad roller moving mechanism 51 and the second pad roller moving mechanism 52 can be simplified.

In addition, it may be structured that, in a standby state before a recording medium 2 is inserted into the medium processing apparatus 1, the pad rollers 45, 47 and 49 are located at the retreated positions 45B, 47B and 49B, and the pad rollers 46, 48 and 50 are located at the contact positions 46A, 48A and 50A.

In the embodiment described above, when a recording medium 2 is inserted into the insertion port 8 in a state that its front face 2a faces upward, magnetic data recorded in a magnetic stripe 2c of the recording medium 2 are read by the magnetic head 24. However, the present invention is not limited to this embodiment. For example, when a recording medium 2 is inserted into the insertion port 8 in a state that its front face 2a faces upward, magnetic data recorded in the magnetic stripe 2c may be read by the pre-head 16. In this case, a time period after magnetic data recorded in the magnetic stripe 2c are read and before magnetic data are written to the magnetic stripe 2c can be lengthened. Therefore, like the embodiment described above, even when magnetic data having been read are transmitted from the control section 5 to the host control section 6 and, based on the magnetic data having been transmitted, magnetic data which are to be written in the magnetic stripe 2c are created in the host control section 6 and the created magnetic data are transmitted from the host control section 6 to the control section 5, a creating time of magnetic data to be written in the magnetic stripe 2c and a communication time between the control section 5 and the host control section 6 can be secured. As a result, even when a conveyance speed of a recording medium 2 is fast, magnetic data can be appropriately written in the recording medium 2 by the magnetic head 26. In this case, no magnetic head 24 may be provided.

In the embodiment described above, the pad rollers 45 through 50 are movable between the contact positions 45A through 50A and the retreated positions 45B through 50B. However, the present invention is not limited to this embodiment. For example, instead of the pad rollers 45 through 50, it may be structured that the magnetic heads 24 through 29 are movable between the contact positions capable of contacting with a recording medium 2 and retreated positions retreated from the medium conveying passage 13. Further, it may be structured that both of the magnetic heads 24 through 29 and the pad rollers 45 through 50 are movable between the contact positions capable of contacting with a recording medium 2 and retreated positions retreated from the medium conveying passage 13.

In the embodiment described above, the magnetic heads 25, 27 and 29 are disposed on a rear side with respect to the magnetic heads 24, 26 and 28 in the front and rear direction. However, the present invention is not limited to this embodiment. For example, the magnetic heads 25, 27 and 29 may be disposed on a front side with respect to the magnetic heads 24, 26 and 28 in the front and rear direction. Further, in the embodiment described above, the pre-head 16 is disposed so as to face the medium conveying passage 13 from a lower side with respect to the medium conveying passage 13. However, the pre-head 16 may be disposed so as to face the medium conveying passage 13 from an upper side with respect to the medium conveying passage 13. Further, two pre-heads 16 may be disposed so as to face the medium conveying passage 13 from both of an upper side and a lower side with respect to the medium conveying passage 13.

In the embodiment described above, the first pad roller moving mechanism 51 moves the pad rollers 45, 47 and 49 together. However, the first pad roller moving mechanism 51 may be structured so as to individually move the pad rollers 45, 47 and 49. Similarly, in the embodiment described above, the second pad roller moving mechanism 52 moves the pad rollers 46, 48 and 50 together. However, the second pad roller moving mechanism 52 may be structured so as to individually move the pad rollers 46, 48 and 50.

In the embodiment described above, the control section 5 determines on the basis of a detection result by the pre-head 16 whether a recording medium 2 has been taken into the medium processing apparatus 1 in a state that the front face 2a of the recording medium 2 faces upward or its back face 2b faces upward and, based on the determined result, the control section 5 operates the first thermal head moving mechanism 38 or the second thermal head moving mechanism 39. However, the present invention is not limited to this embodiment. For example, it may be structured that the control section 5 determines whether magnetic data are read by the magnetic head 24 or the magnetic head 25 and, thereby the control section 5 determines whether a recording medium 2 has been taken into the medium processing apparatus 1 in a state that the front face 2a of the recording medium 2 faces upward or its back face 2b faces upward and, based on the determined result, the control section 5 operates the first thermal head moving mechanism 38 or the second thermal head moving mechanism 39.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium processing apparatus for use with a card-shaped recording medium having a magnetic stripe, the medium processing apparatus comprising:
   a medium conveying passage along which the card-shaped recording medium having a magnetic stripe is conveyed;
   a magnetic head part comprising;
       a first magnetic head which faces the medium conveying passage from one side in a thickness direction of the recording medium passing through the medium conveying passage;
       a second magnetic head which faces the medium conveying passage from the other side in the thickness direction of the recording medium;
       a first pad roller which is oppositely disposed to the first magnetic head and is urged toward the first magnetic head; and
       a second pad roller which is oppositely disposed to the second magnetic head and is urged toward the second magnetic head;
   a first moving mechanism which moves the first magnetic head and/or the first pad roller between a first contact position for contacting the first magnetic head and the first pad roller with the recording medium and a first retreated position where the first magnetic head and/or the first pad roller are retreated in a direction separated from the medium conveying passage; and a second moving mechanism which moves the second magnetic head and/or the second pad roller between a second contact position for contacting the second magnetic head and the second pad roller with the recording medium and a second retreated position where the second magnetic head and/or the second pad roller are retreated in a direction separated from the medium conveying passage;

wherein the first magnetic head and the second magnetic head are displaced from each other in a conveyance direction of the recording medium in the magnetic head part; and wherein a distance between the first magnetic head and the second magnetic head in the conveyance direction of the recording medium is shorter than a length of a recorded range of magnetic data recorded in the magnetic stripe.

2. The medium processing apparatus according to claim 1, further comprising a detection mechanism which is disposed on an upstream side in the conveyance direction of the recording medium with respect to the magnetic head part and is structured to detect whether the recording medium is inserted into the medium processing apparatus in a state that one face of the recording medium faces on a first magnetic head side or the other face of the recording medium faces on the first magnetic head side, wherein the first moving mechanism and the second moving mechanism are controlled on a basis of a detection result by the detection mechanism.

3. The medium processing apparatus according to claim 2, wherein the detection mechanism is a pre-head which detects the magnetic stripe.

4. The medium processing apparatus according to claim 3, wherein the pre-head is disposed so as to face the medium conveying passage from either of one side or the other side in the thickness direction of the recording medium.

5. The medium processing apparatus according to claim 3, wherein
the magnetic head part comprises:
a first magnetic head part in which the first magnetic head and the second magnetic head are a reading head for reading magnetic data recorded in the magnetic stripe; and
a second magnetic head part in which the first magnetic head and the second magnetic head are a writing head for writing magnetic data in the magnetic stripe,
the second magnetic head part is disposed on a downstream side in the conveyance direction of the recording medium with respect to the first magnetic head part, and
the pre-head reads magnetic data recorded in the magnetic stripe.

6. The medium processing apparatus according to claim 1, wherein the magnetic stripe is formed over an entire face of one face of the recording medium.

7. The medium processing apparatus according to claim 1, wherein
the first magnetic head is disposed so as to face the medium conveying passage from a lower side,
the second magnetic head is disposed so as to face the medium conveying passage from an upper side, and
in a standby state before the recording medium is inserted, the first magnetic head and/or the first pad roller are disposed at the first contact position, and the second magnetic head and/or the second pad roller are disposed at the second retreated position.

8. The medium processing apparatus according to claim 7, wherein the second magnetic head is disposed on a downstream side in the conveyance direction of the recording medium with respect to the first magnetic head.

9. The medium processing apparatus according to claim 1, wherein
the magnetic head part comprises a plurality of magnetic head parts,
the first moving mechanism moves the first magnetic heads and/or the first pad rollers of the plurality of the magnetic head parts together, and
the second moving mechanism moves the second magnetic heads and/or the second pad rollers of the plurality of the magnetic head parts together.

10. A medium processing apparatus for use with a card-shaped recording medium having a magnetic stripe, the medium processing apparatus comprising:
a medium conveying passage along which the card-shaped recording medium having a magnetic stripe is conveyed;
a first magnetic head which faces the medium conveying passage from one side in a thickness direction of the recording medium passing through the medium conveying passage;
a second magnetic head which faces the medium conveying passage from the other side in the thickness direction of the recording medium;
a detection mechanism which is disposed on an upstream side in the conveyance direction of the recording medium with respect to the first magnetic head and the second magnetic head and is structured to detect whether the recording medium is inserted into the medium processing apparatus in a state that one face of the recording medium faces on a first magnetic head side or the other face of the recording medium faces on the first magnetic head side;
a first thermal head which faces the medium conveying passage from one side in the thickness direction of the recording medium;
a second thermal head which faces the medium conveying passage from the other side in the thickness direction of the recording medium;
a first moving mechanism which moves the first thermal head between a first contact position for contacting the first thermal head with the recording medium and a first retreated position where the first thermal head is retreated in a direction separated from the medium conveying passage;
a second moving mechanism which moves the second thermal head between a second contact position for contacting the second thermal head with the recording medium and a second retreated position where the second thermal head is retreated in a direction separated from the medium conveying passage; and
a control section for controlling the first thermal head, the second thermal head, the first moving mechanism and the second moving mechanism;
wherein the control section operates the first moving mechanism or the second moving mechanism based on a detection result by the detection mechanism to arrange the first thermal head to the first contact position or to arrange the second thermal head to the second contact position, and
wherein the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium.

11. The medium processing apparatus according to claim 10, wherein the detection mechanism is a pre-head for detecting the magnetic stripe.

12. A medium processing apparatus for use with a card-shaped recording medium having a magnetic stripe, the medium processing apparatus comprising:
   a medium conveying passage along which a card-shaped recording medium having a magnetic stripe is conveyed;
   a first magnetic head which faces the medium conveying passage from one side in a thickness direction of the recording medium passing through the medium conveying passage;
   a second magnetic head which faces the medium conveying passage from the other side in the thickness direction of the recording medium;
   a first thermal head which faces the medium conveying passage from one side in the thickness direction of the recording medium;
   a second thermal head which faces the medium conveying passage from the other side in the thickness direction of the recording medium;
   a first moving mechanism which moves the first thermal head between a first contact position for contacting the first thermal head with the recording medium and a first retreated position where the first thermal head is retreated in a direction separated from the medium conveying passage;
   a second moving mechanism which moves the second thermal head between a second contact position for contacting the second thermal head with the recording medium and a second retreated position where the second thermal head is retreated in a direction separated from the medium conveying passage; and
   a control section for controlling the first thermal head, the second thermal head, the first moving mechanism and the second moving mechanism;
   wherein the control section determines whether the first magnetic head has read magnetic data or the second magnetic head has read magnetic data and, based on the determined result, the control section operates the first moving mechanism or the second moving mechanism to arrange the first thermal head to the first contact position or to arrange the second thermal head to the second contact position, and
   wherein the control section determines whether the recording medium is taken into the medium conveying passage from one end side of the recording medium or from the other end side based on a reading result of magnetic data by the first magnetic head or the second magnetic head and, based on the determined result, the control section prints on the recording medium by using the first thermal head or the second thermal head while performing temperature control of the first thermal head or the second thermal head and performing conveyance control of the recording medium.

13. A control method for a medium processing apparatus including:
   a medium conveying passage along which a card-shaped recording medium having a magnetic stripe is conveyed;
   a first magnetic head which faces the medium conveying passage from one side in a thickness direction of the recording medium passing through the medium conveying passage;
   a second magnetic head which faces the medium conveying passage from the other side in the thickness direction of the recording medium;
   a first thermal head which faces the medium conveying passage from one side in the thickness direction of the recording medium, the first thermal head being movable between a first contact position for contacting the first thermal head with the recording medium and a first retreated position where the first thermal head is retreated in a direction separated from the medium conveying passage; and
   a second thermal head which faces the medium conveying passage from the other side in the thickness direction of the recording medium, the second thermal head being movable between a second contact position for contacting the second thermal head with the recording medium and a second retreated position where the second thermal head is retreated in a direction separated from the medium conveying passage;
   the control method comprising:
   a first taking-in direction determining step which determines whether the recording medium has been inserted into the medium processing apparatus in a state that one face of the recording medium faces on a first magnetic head side or the other face of the recording medium faces on the first magnetic head side;
   a second taking-in direction determining step which determines whether the recording medium has been taken into the medium conveying passage from one end side of the recording medium or from the other end side based on a reading result of magnetic data by the first magnetic head or the second magnetic head;
   a thermal head moving step in which, based on a determined result in the first taking-in direction determining step, the first thermal head is moved to the first contact position or the second thermal head is moved to the second contact position; and
   a printing step in which, based on a determined result in the second taking-in direction determining step, printing is performed on the recording medium by the first thermal head or the second thermal head which is moved in the thermal head moving step while performing temperature control of the first thermal head or the second thermal head and performing conveyance control of the recording medium.

* * * * *